(12) United States Patent
Austria et al.

(10) Patent No.: US 12,600,319 B2
(45) Date of Patent: *Apr. 14, 2026

(54) VEHICLE DOOR INTERFACE SYSTEM

(71) Applicant: Zoox, Inc., Foster City, CA (US)

(72) Inventors: Auver Cedric Austria, Melbourne (AU); Michael Moshe Kohen, Palo Alto, CA (US); Kevin Mark Karol, San Francisco, CA (US); Ishan Sain, San Mateo, CA (US); Amy Chong, San Francisco, CA (US); Andrew Allen Haskin, San Francisco, CA (US); Jingyi Zhang, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/968,348

(22) Filed: Dec. 4, 2024

(65) Prior Publication Data

US 2025/0170985 A1 May 29, 2025

Related U.S. Application Data

(63) Continuation of application No. 18/586,340, filed on Feb. 23, 2024, now Pat. No. 12,187,224, which is a
(Continued)

(51) Int. Cl.
B60R 25/01 (2013.01)
B60Q 9/00 (2006.01)
(Continued)

(52) U.S. Cl.
CPC ................ B60R 25/01 (2013.01); B60Q 9/00 (2013.01); B60R 25/10 (2013.01); B60R 25/305 (2013.01);
(Continued)

(58) Field of Classification Search
CPC ....... B60R 25/01; B60R 25/10; B60R 25/305; B60R 25/31; B60R 25/34; B60R 25/2036; B60R 25/2045; B60R 25/2018; B60R 25/255; B60R 25/241; B60R 25/24; B60R 25/243; B60R 25/007; B60R 2225/00;
(Continued)

(56) References Cited

U.S. PATENT DOCUMENTS 9,607,460 B2 * 3/2017 Yamane ............. G07C 9/00309
10,384,519 B1 8/2019 Brown et al.
(Continued)

OTHER PUBLICATIONS

Office Action for U.S. Appl. No. 17/112,273, mailed on Feb. 28, 2022, Austria, "Vehicle Door Interface System", 12 Pages.
(Continued)

*Primary Examiner* — Nathnael Aynalem
(74) *Attorney, Agent, or Firm* — Lee & Hayes, P.C.

(57) ABSTRACT

A door interface system for a vehicle door includes a sensor and a visual indicator. The sensor may be a proximity sensor and may be positioned proximate to the visual indicator such that it will detect an object proximate to the proximity sensor. The visual indicator may convey the position of the sensor and/or a status of the vehicle door. The door interface system is configured to control the vehicle door based at least in part on detecting an object proximate the visual indicator.

20 Claims, 14 Drawing Sheets

Related U.S. Application Data continuation of application No. 17/112,308, filed on Dec. 4, 2020, now Pat. No. 11,912,233.

(51) Int. Cl.

| | | |
|---|---|---|
| *B60R 25/10* | (2013.01) | |
| *B60R 25/30* | (2013.01) | |
| *B60R 25/31* | (2013.01) | |
| *B60R 25/34* | (2013.01) | |
| *G06V 20/56* | (2022.01) | |

(52) U.S. Cl.
CPC .............. *B60R 25/31* (2013.01); *B60R 25/34* (2013.01); *G06V 20/56* (2022.01)

(58) Field of Classification Search
CPC .......... B60Q 9/00; B60Q 1/247; B60Q 1/249; B60Q 1/245; B60Q 2400/40; B60Q 2400/50; G06V 20/56; E05F 15/73; E05F 2015/765; E05F 2015/767
USPC ......................................................... 348/148
See application file for complete search history.

(56) References Cited

U.S. PATENT DOCUMENTS

| | | | | |
|---|---|---|---|---|
| 10,384,645 | B1 | 8/2019 | Chen et al. | |
| 2007/0200672 | A1* | 8/2007 | McBride ............ | G07C 9/00309 |
| | | | | 340/5.72 |
| 2008/0001708 | A1 | 1/2008 | Nakashima et al. | |
| 2016/0358395 | A1 | 12/2016 | Dry | |
| 2018/0290627 | A1* | 10/2018 | Hariri .................. | B60R 25/245 |
| 2019/0039571 | A1* | 2/2019 | Shimizu ................. | E05B 81/64 |
| 2019/0348984 | A1 | 11/2019 | Oakes et al. | |
| 2020/0001822 | A1 | 1/2020 | Han et al. | |
| 2020/0071983 | A1 | 3/2020 | Ottmann et al. | |
| 2020/0232262 | A1 | 7/2020 | Marlia | |
| 2021/0009079 | A1 | 1/2021 | Bourassi et al. | |
| 2021/0039596 | A1 | 2/2021 | Park | |
| 2021/0277705 | A1 | 9/2021 | Chang et al. | |
| 2022/0030384 | A1* | 1/2022 | Hasegawa .............. | B60R 25/31 |
| 2024/0198954 | A1 | 6/2024 | Austria et al. | |

OTHER PUBLICATIONS

Office Action for U.S. Appl. No. 17/112,273, mailed on Aug. 25, 2022, Austria, "Vehicle Door Interface System" 15 pages.

Office Action for U.S. Appl. No. 17/112,308, mailed on Jan. 5, 2023, Austria, "Vehicle Door Interface System", 15 pages.

Office Action for U.S. Appl. No. 17/112,308, mailed on May 18, 2023, Austria, "Vehicle Door Interface System", 21 Pages.

Office Action for U.S. Appl. No. 17/112,308, mailed on Sep. 1, 2022, Austria, "Vehicle Door Interface System" 15 pages.

* cited by examiner

1000

1002

RECEIVE DATA ON AREA PROXIMATE THE DOOR INTERFACE MODULE USING PROXIMITY SENSOR

1004

DETECT AN ACTIVATION EVENT

NO

YES

1008

DETECT A DEACTIVATION EVENT

NO

YES

1010

CONTROLLING OPERATION OF THE DOOR

VEHICLE DOOR INTERFACE SYSTEM

CROSS-REFERENCE TO RELATED APPLICATIONS

This patent application is a continuation of U.S. Non-Provisional patent application Ser. No. 18/586,340 filed on Feb. 23, 2024, titled "VEHICLE DOOR INTERFACE SYSTEM," which is a continuation of U.S. Non-Provisional patent application Ser. No. 17/112,308 filed on Dec. 4, 2020, titled, "VEHICLE DOOR INTERFACE SYSTEM," which are incorporated by reference in their entirety.

BACKGROUND

Traditional vehicles generally include an interior space within which one or more passengers may be seated during use of the vehicle. Such vehicles typically also include one or more doors that may be opened or closed from the exterior of the vehicle to allow passengers access to the interior space. For example, the doors may be transitioned between an open position allowing passengers to enter or exit interior space, and a closed position substantially enclosing the exterior space. A passenger wishing to enter the interior space may open one of the doors by pulling on a handle to open the vehicle. Additionally, the door generally must be placed in an unlocked or openable configuration by the driver of the vehicle. However, opening and closing doors of a vehicle in the manner described above can be problematic in some situations including in self-driving cars without a driver and/or in ride share situations. An autonomous vehicle may not have driver who is able to unlock a vehicle door and move it to an open or openable position when it is appropriate for passengers to enter or exit the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
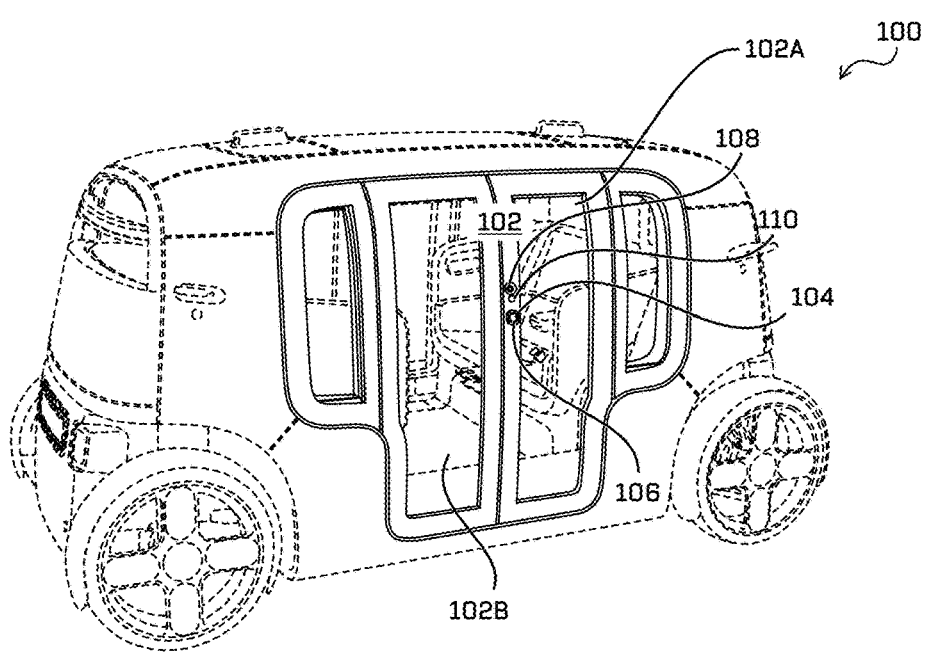
FIG. 1A is a perspective view of an example vehicle door interface system.

Example vehicles, such as example autonomous vehicles, include a first longitudinal end, a second longitudinal end opposite the first longitudinal end, a first lateral side, and a second lateral side opposite the first lateral side. In some examples, a lateral side of the vehicle may include one or more doors movably connected to a frame, body, and/or other component of the vehicle via one or more vehicle door actuator systems. In such examples, the vehicle door actuator systems are configured to transition the door between an open position providing access to an interior space of the vehicle and a closed position blocking access to the interior space. The door may comprise first and second door panels which move in opposite directions along the longitudinal axis of the vehicle to open the door. In some examples, the vehicle includes a door interface system configured to control the actuator system.

This application relates to a door interface system for a vehicle door that includes a sensor and a visual indicator. In various examples the sensor is a proximity sensor having and infrared light emitter and a light detector or receiver. In any such examples, the proximity sensor can be positioned proximate to the visual indicator such that it will detect an object proximate to the proximity sensor. The door interface system is configured to control the vehicle door based at least in part on detecting an object proximate the visual indicator. In some examples, the door interface system is positioned on one of the door panels.

In some examples, the visual indicator comprises one or more light sources (such as light-emitting diodes) disposed around a periphery of the proximity sensor. In some examples, the light-emitting diodes are arranged to form a shape, for example a circle, oval, square, square with rounded corners. In some examples, the light-emitting diodes are arranged to form a pair of semi-circles, a pair of square brackets, or a pair of square brackets with rounded corners. The semi-circles or brackets can be oriented top to bottom or side to side, though any other orientation is contemplated. In some examples, the light-emitting diodes are arranged to form any other applicable shape. The visual indicator may be configured to convey the status of the door. As non-limiting examples, such statuses may include locked, unlocked, opening and closing. Other examples include an indication that the user has been authenticated, that there was an error in door operation, or that the door interface system is placing a call, as discussed further below. The proximity sensor can use different patterns and/or colors to indicate the status of the vehicle door.

In some examples, a portion of the exterior surface of the door or door panel is transparent. In such examples, the door interface system may be positioned behind a transparent portion of the door. The door may be operated by detection of an object proximate the door interface system wherein the transparent exterior surface is positioned in between the object and the door interface system. The object may be detected by a sensor including a camera or proximity sensor including an inferred proximity sensor.

In some examples, the door interface system can be operated by determining, based at least in part on sensor data associated with the door interface system, that an object is within a first threshold distance of a portion of the door indicated by a visual indicator at a first time and subsequently determining, based at least in part on additional sensor data, that the object has moved a second threshold distance away from the portion of the door indicated by the visual indicator, and then, in response, opening the vehicle door.

While this application discusses examples in which the door interface system is applied to a vehicle having sliding doors on its lateral sides, this application is not limited to vehicles. The door interface system described in this application can be applied to doors in other types of moving vehicles such as boats or airplanes. The door interface system described in this application can also be applied to doors in non-vehicle settings including buildings or in furniture. The door interface systems described in this application can be applied to control any electronically operable door.

The techniques described herein can be implemented in a number of ways. Example implementations are provided below with reference to the following figures.

Figure 1B:
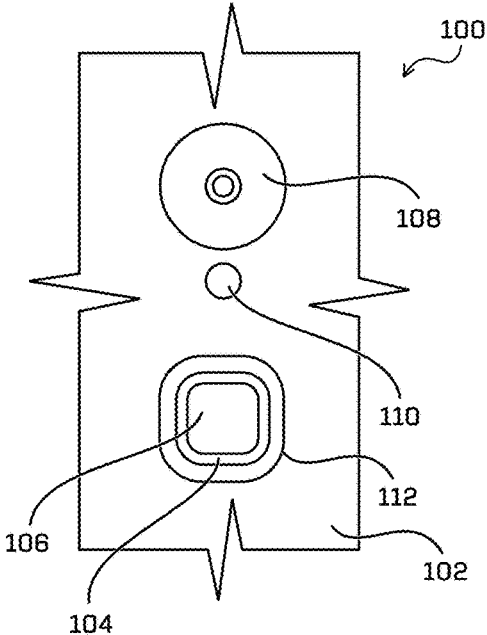
FIG. 1B is front view of the example vehicle door interface system of FIG. 1A.

FIGS. 1A and 1B show an example of a door interface system 100 positioned on door 102. In some examples, the door interface system 100 positioned on or proximate an exterior surface of the door 102. In some examples, the door 102 may consist of a first door panel 102A and a second door panel 102B. The door interface system 100 may be positioned on the first door panel 102A of the door. The door interface system 100 generally includes a visual indicator 104 and at least one sensor 106. In some examples, the door interface system 100 can be place in another position on the door 102 or may be placed a portion of the vehicle other than the door.

Figure 2A:
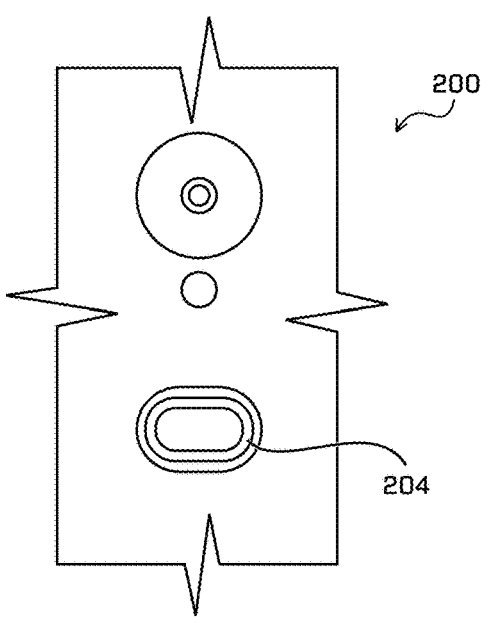
FIG. 2A is a front view of another example vehicle door interface system.
Figure 2B:
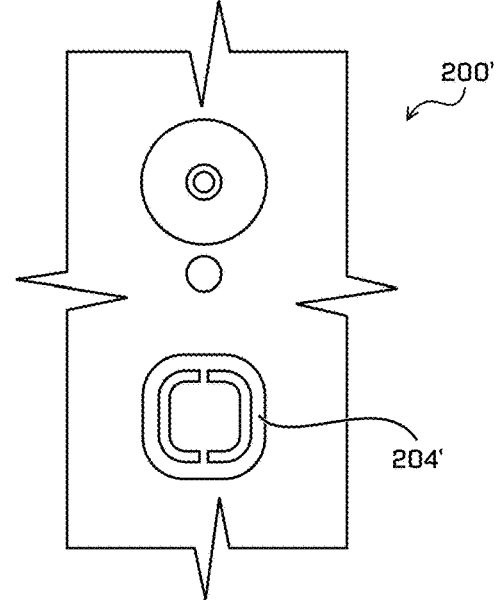
FIG. 2B is a front view of another example vehicle door interface system.
Figure 2C:
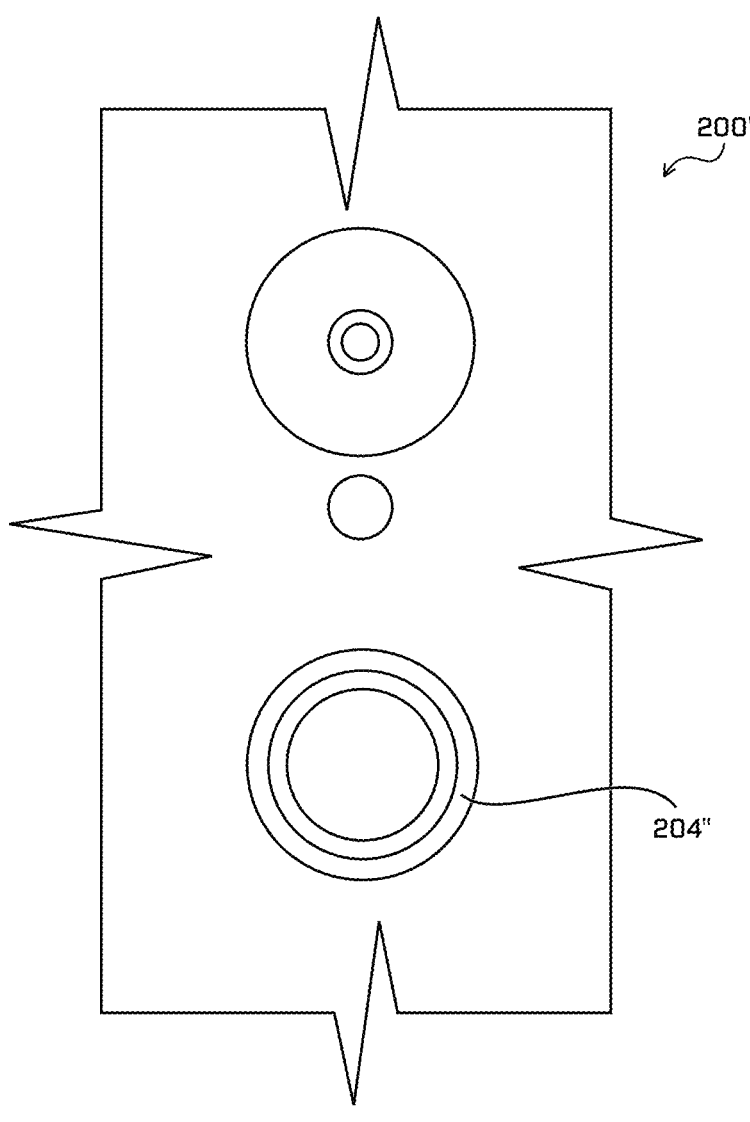
FIG. 2C is a front view of another example vehicle door interface system.

In some examples, the visual indicator 104 is configured to resemble a conventional button. In some examples, the visual indicator 104 may be a raised or depressed portion of the exterior surface of the door 102. In some examples, the visual indicator 104 can be a portion of the vehicle door 102 that is a different color or material. In some examples, the visual indicator 104 can include a light source that emits light as discussed in FIGS. 3A-B and 4A-B below. In the example shown in FIGS. 1A and 1B, the visual indicator 104 has a generally square shape with rounded corners. FIG. 2A shows another example of a door interface system 200 wherein the visual indicator 204 is oval or capsule shaped. FIG. 2B shows another example of a door interface system 200' wherein the visual indicator 204' is formed from one or more brackets or semi-circles. FIG. 2C shows another example of a door interface system 200" wherein the visual indicator 204" is circle shaped. In some examples, the visual indicator can form other shapes including a square with right angles, rectangle, triangle, hexagon, octagon, or trapezoid. The visual indicator may comprise a solid shape or may include one or more breaks. For example, the visual indicator can be shaped in a circle with breaks at the top and bottom such that it appears to be two semicircles or prentices. In other examples, the breaks can be on the sides of the visual indicator or spaces around the visual indicator.

Though described as a circle with breaks, breaks can be used in a visual indicator of any shape described above. In some examples, the visual indicator 104 has a width or diameter of around 10 cm to around 40 cm. In some examples, the visual indicator 104 has a width or diameter of around 20 cm to around 30 cm. In one particular example, the visual indicator 104 has a width or diameter of approximately 25 cm. In some examples, the visual indicator 104 may be any shape, size, or position to indicate the position of the sensor 106.

The door interface system 100 includes at least one sensor 106 configured to collect data regarding the area proximate the vehicle door 102. In some examples, the at least one sensor 106 can include a LIDAR sensor, radar sensor, ultrasonic transducers, sonar sensors, infrared sensors, cameras, depth sensors (e.g., stereo cameras, structured light sensors, etc.) or any other sensor configured to determine the proximity of an object in the area proximate to the visual indicator 104. In some examples, the proximity sensor 106 is positioned proximate to the visual indicator 104. In some examples, the visual indicator 104 is positioned around the periphery of the sensor 106. The sensor 106 is configured to detect an object that is moved into and/or away from the vicinity of the visual indicator 104. In additional or alternate examples, such sensors may comprise touch sensors (e.g., capacitive, inductive, or resistive touch sensors), pressure sensors, electromagnetic sensors (e.g., WiFi, Bluetooth, Near Field Communication, etc.), or otherwise that may be used in alone or in conjunction with the "visual" sensors to determine a touch event or increase the confidence of a detected touch event.

In some examples, the door interface system 100 can include additional sensors 108, 110 configured to capture data representing an environment proximate the door 102 of the vehicle. For example, the door interface system 100 can include a camera 108 configured to capture image data of the area proximate the door 102. As discussed further below, the image data captured by the camera 108 may be used to identify the passenger or any hazards that would prevent safe operation of the vehicle door 102. Additional sensors may include an ambient light sensor 110 which can assist in the function of the camera 108 and/or sensor 106.

The door interface system 100 may include a processor and memory configured to process the data collected from the sensors 106, 108, 110, and sending and/or signals to the actuating system for the door 102. The processor can be any suitable processor capable of executing instructions to process data and perform operations as described herein. By way of example and not limitation, the processor can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions. Memory includes non-transitory computer-readable media. The memory can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. In some examples, the door interface system 100 can be operated by the vehicle processor and memory discussed further below.

Figure 3A:
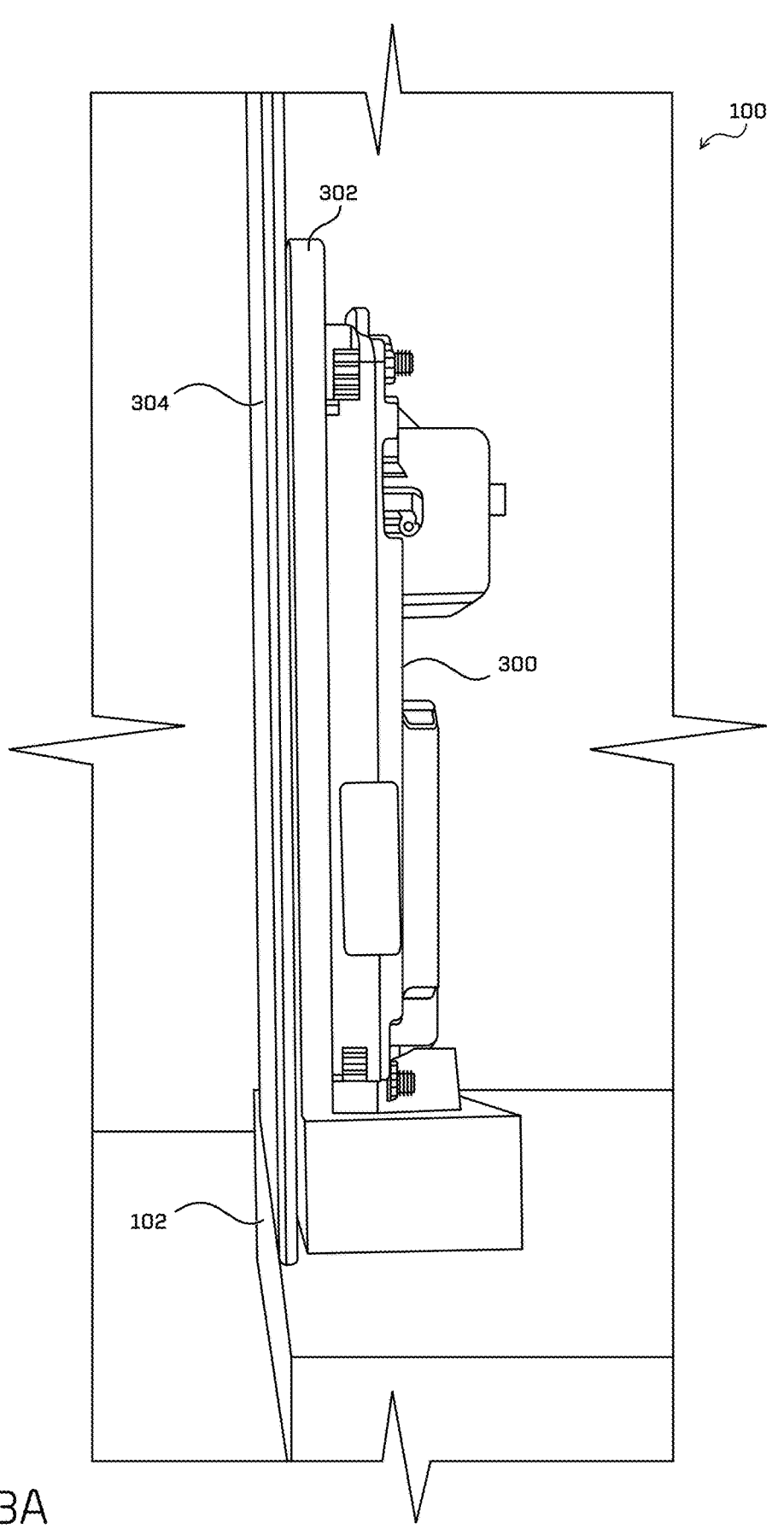
FIG. 3A is a side view of an example vehicle door interface system.
Figure 3B:
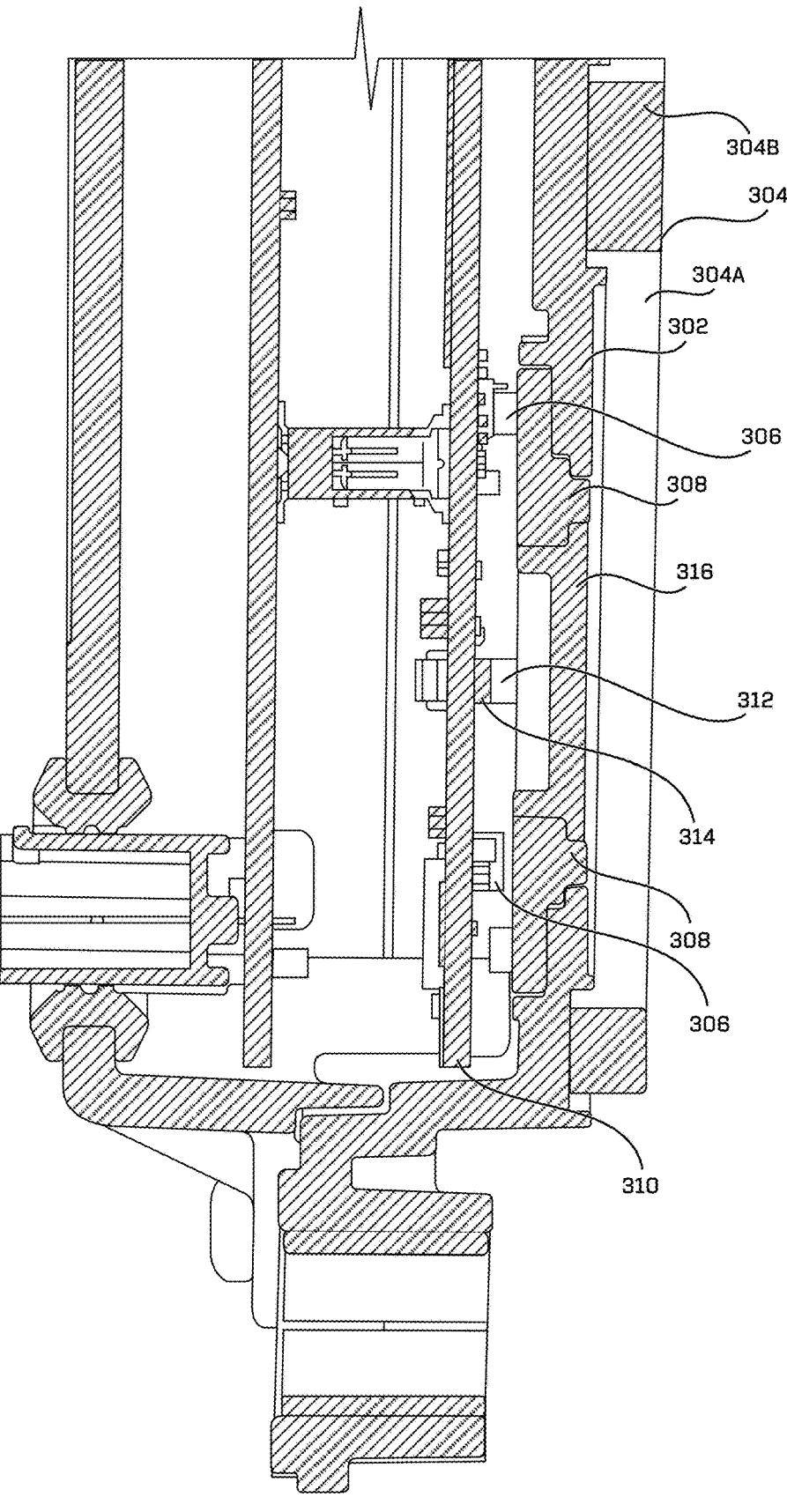
FIG. 3B is a cross-sectional view of a portion of an example vehicle door interface system.

FIGS. 3A and 3B show side views of an example door interface system 100. The door interface system 100 generally includes a housing 300 that may contain the visual indicator 104 and sensors 106, 108, 110. The housing 300 may contain a processor and memory configured to operate the door interface system 100. The housing 300 may include a front surface 302 that may be affixed to an interior surface of the exterior wall 304 of the vehicle door 102. In some examples, the front surface 302 of the door interface system may be substantially planer or may be curved to match the shape of the exterior wall 304 of the vehicle door. In some examples, at least the portion of the exterior wall 304 of the vehicle door positioned in front of the door interface system 100 is substantially transparent. In examples, the portion of the exterior wall 304 that is transparent 112 is positioned above the visual indicator 104, as shown in FIG. 1B. The transparent portion 112 may be larger than the outline of the visual indicator 104 but have the same general shape as the visual indicator. In some examples, the front surface 302 is opaque. The front surface 302 may be a similar color to other features of the vehicle door 102. In some examples, all or some of the front surface 302 may be transparent or translucent.

As shown in FIG. 3B, the visual indicator 104 can be formed from one or more light emitting diodes ("LEDs") 306 positioned in proximity to at least one light guide 308. The light guide 308 can comprise a light pipe or another optical diffuser configured to disperse the light. In the depicted example, the LEDs 306 are electronically coupled to a printed circuit board 310 contained in the housing 300 of the door interface system 100. The LEDs 306 may be red-green-blue LEDs which can be configured to display a broad spectrum of colors. In some examples, the LEDs 306 may be configured to depict only white light or a single color. The LEDs 306 may be positioned below a light pipe 308, which is configured to distribute and/or diffuse the light generated by the LEDs 306. In some examples, the light pipe 308 is positioned in proximity to the front surface 302 of the housing 300 of the door interface system 100. In the example shown in FIG. 3B, the light pipe 308 is in-line or flush with the front surface 302. In some examples, the light pipe 308 may be set in or raised up from the front surface 302 of the housing 300. The light pipe 308 is positioned such that the portion of the light pipe that is visible 308A forms the shape of the visual indicator 104 discussed above. Portions of the light pipe 308B may be obscured by the front surface 302 of the door interface system housing 300. The light pipe 308 may be formed from any substantially transparent light emitting material including an optical acrylic or polycarbonate material.

In some examples, the sensor 106 is an infrared proximity sensor comprising an infrared emitter 312 and a light detector or receiver 314. In some examples, the infrared emitter 312 and receiver 314 are electronically coupled to the same printed circuit board 310 as the LEDs 306 of the visual indicator 104. In some examples, the door interface system 100 can comprise multiple printed circuit boards. The sensor can also include an infrared window 316 that defines the area for data collection by the infrared proximity sensor 106. In some examples, the infrared window 316 has a width or diameter of between about 8 cm and about 30 cm. In some examples, the infrared window has a width or diameter of between about 15 cm and about 25 cm. In some examples, the infrared window has a width or diameter of about 20 cm. The infrared window 316 can be formed from any infrared transmitting material, including, but not limited to Calcium Fluoride, Sapphire, IR Polymer, Germanium, Zinc Selenide, and Barium Fluoride. In some examples, the infrared window 316 is formed from a material that transmits infrared light having a certain wavelength. The infrared window 316 may be configured to filter out extraneous infrared light to improve performance of the sensor. In some examples, the proximity sensor 106 can additionally or alternatively include an inductive proximity sensor, a capacitive proximity sensor, or an ultrasonic proximity sensor.

In some examples, the sensor is configured to have an input response time of between about 0 seconds and about 1 second. In some example examples, the sensor is configured to have a system response time of between about 0 seconds and about 0.1 seconds. In some examples, the sensor 106 is configured to detect objects within a threshold distance from the exterior surface 304 of the vehicle. In some examples, the sensor 106 detects objects that are less than the threshold distance away from the exterior surface 304, up to and including touching the exterior surface 304. By way of example and not limitation, the sensor 106 may be configured to detect objects within 20 cm of the infrared window 316. In some examples, the sensor 106 is configured to detect objects within 5 cm of the infrared window 316. In some examples, the sensor 106 is configured to detect objects within 1 cm of the infrared window 316.

As shown in FIG. 3B, the exterior surface 304 of the vehicle door is positioned in front of the front surface 302 of the door interface system 100, such that the exterior surface 304 is positioned in between the door interface system 100 and the exterior of the vehicle. In some examples, the exterior surface 304 of the door includes portions that are transparent 304A and portions that are opaque 304B. In some examples, the portion of the exterior surface 304 positioned in front of the visual indicator 104 and proximity sensor 106 of the door interface system 100 is substantially transparent 304A.

Figure 4A:
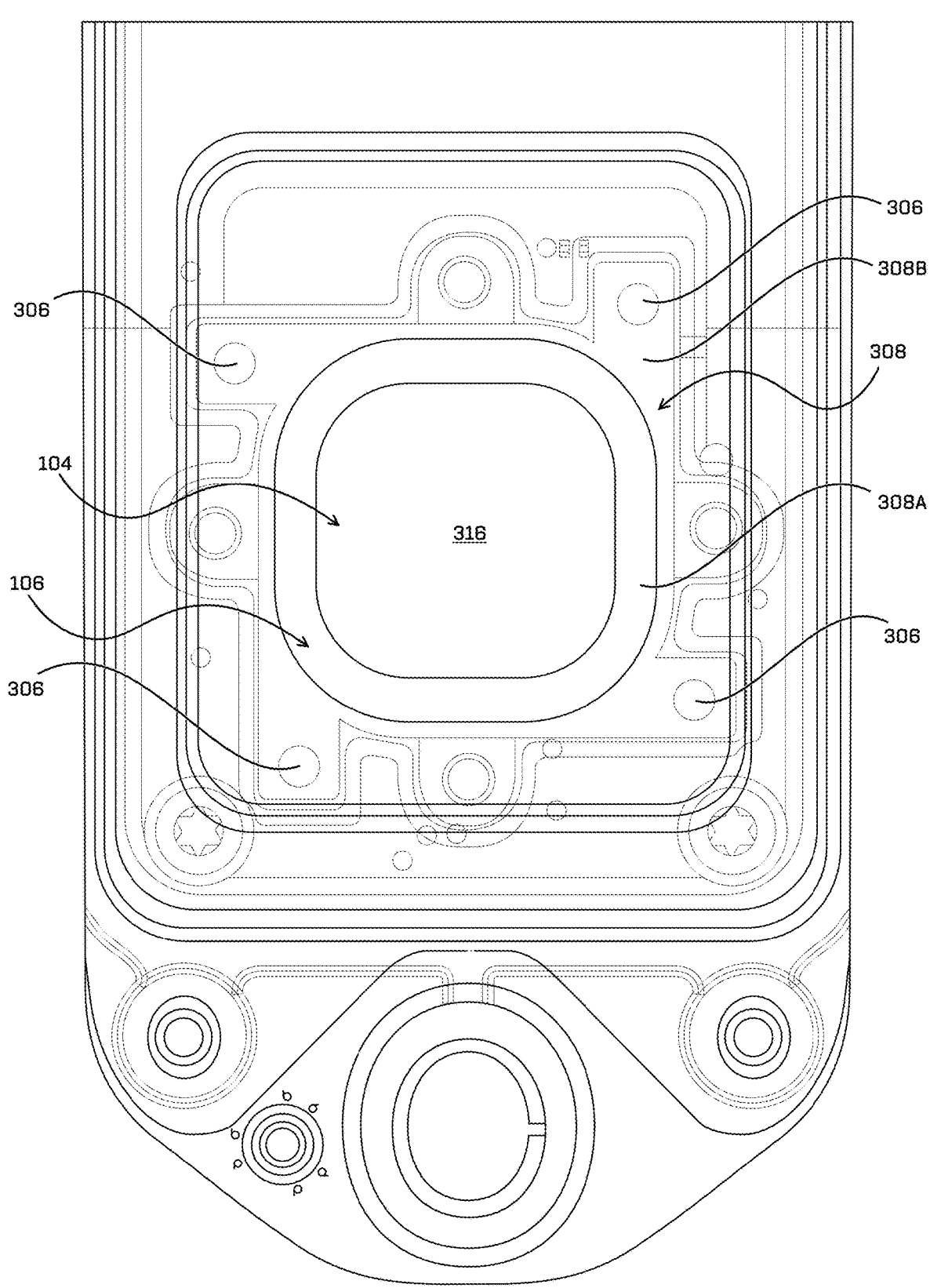
FIG. 4A is a front view of a portion of an example vehicle door interface system with a cover removed.

FIG. 4A shows a top view of the door interface system 100 where the front surface 302 of the housing 300 is shown transparent to illustrate the shape of the light pipe 308 and position of the LEDs 306. In the example shown in FIG. 4A, the light pipe 308 includes a series of spokes with an LED 306 positioned below the light pipe 308 proximate the end of each spoke. While the depicted example includes four spokes in the light pipe 308 and four LEDs 306, a person of ordinary skill would recognize that more or fewer LEDs could be used. In some examples, the visual indicator 104 may comprise only one LED. In some examples, the visual indicator 104 may comprise as many LEDs as is necessary to form the desired visual indicator. In the example shown, a portion of the light pipe 308B is obscured by the front surface 302 of the door interface system housing 300. The visible portion 308A of the light pipe 308 forms the shape of the visual indicator 104. In some examples, the entire light pipe 308 is visible.

Figure 4B:
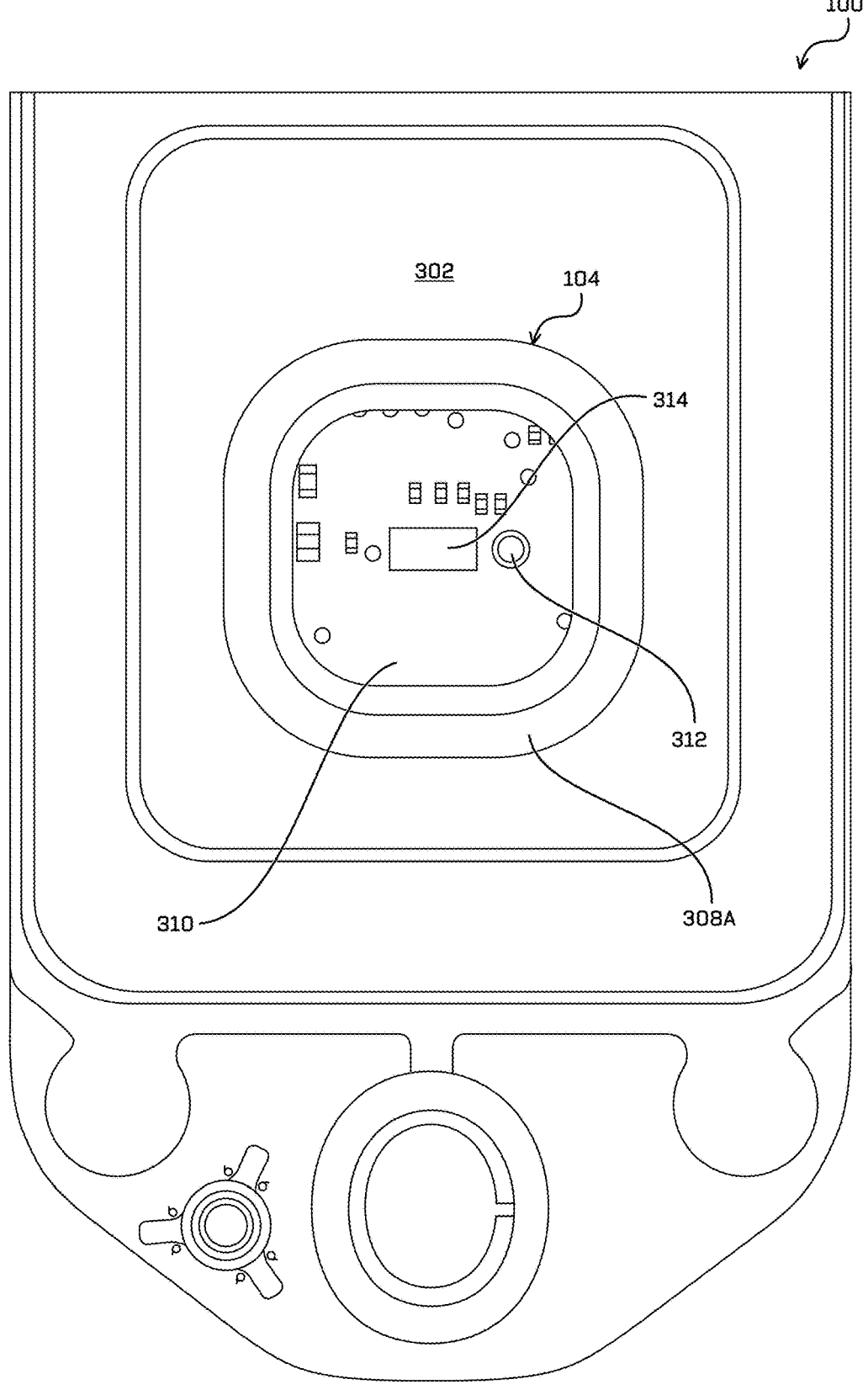
FIG. 4B is another front view of a portion of the example vehicle door interface system of FIG. 4A where the exterior surface is invisible to show additional features.

FIG. 4B shows a top view of the door interface system 100 with the infrared window 316 removed. In this view, the visual portion 308A of the light pipe 308 can be seen surrounded by the front surface 302 of the housing 300 to form the shape of the visual indicator 104. In this example, the visual portion 308A of the light pipe surrounds the infrared emitter 312 and receiver 314 such that the area detected by the proximity is the area in front of the visual indicator 104.

Figure 5:
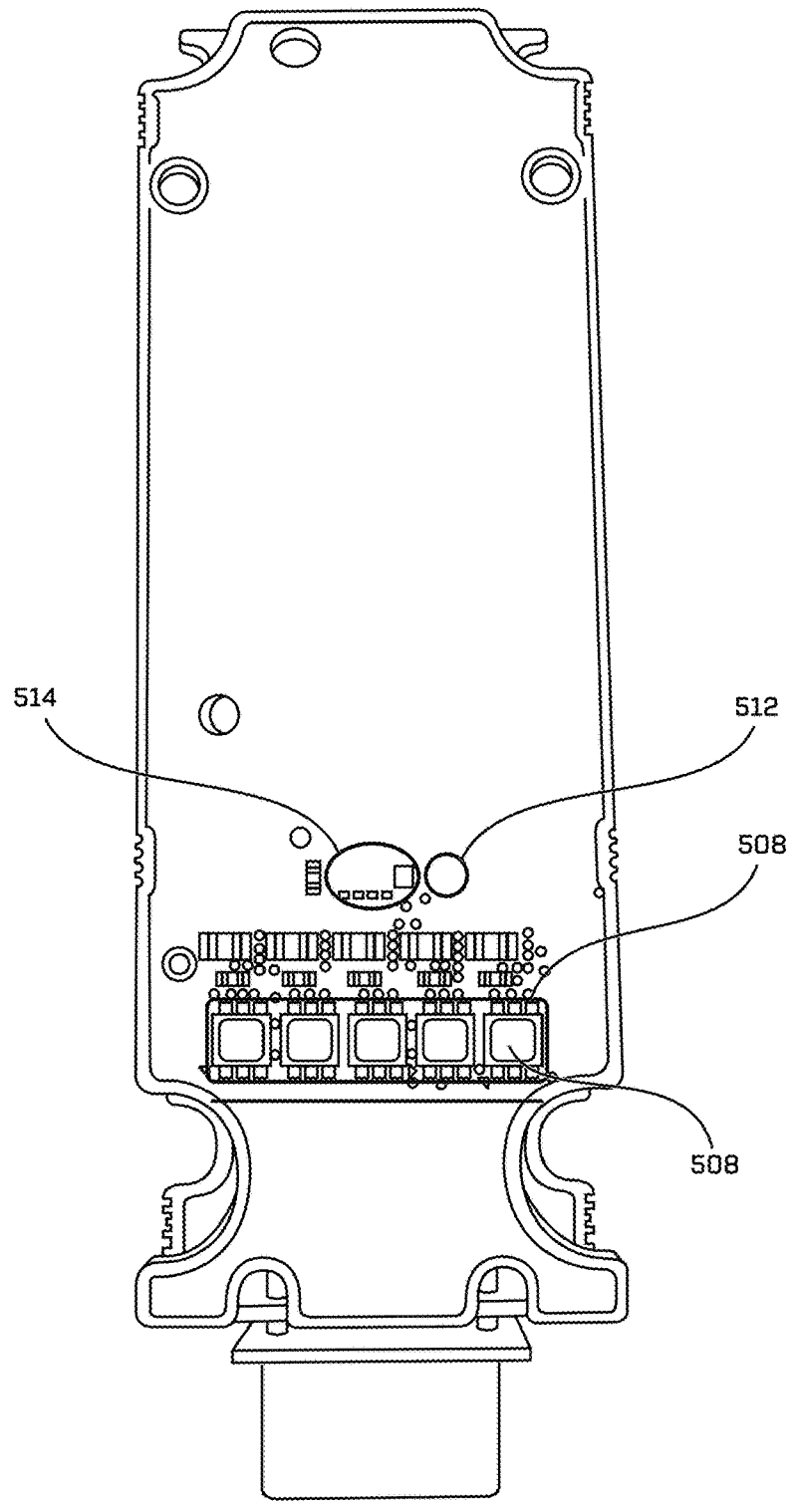
FIG. 5 is a front view of a printed circuit board of the example vehicle door interface system of FIG. 4A where the infrared window is invisible to show additional features.

In some examples, the proximity sensor is not surrounded by the visual indicator. For example, FIG. 5 shows a printed circuit board 510 for an example door interface system. In the depicted example, the visual indicator 504 comprises a series of LEDs 508 positioned in proximity to the infrared emitter 512 and receiver 514 of the proximity sensor 506. Here, the visual indicator 504 is positioned below the proximity sensor 506. In some examples, the visual indicator 504 may positioned above or to the side of the proximity sensor 506. In some examples, the visual indicator 504 may form a shape, such as an arrow, to indicate the position of the proximity sensor.

Figure 6:
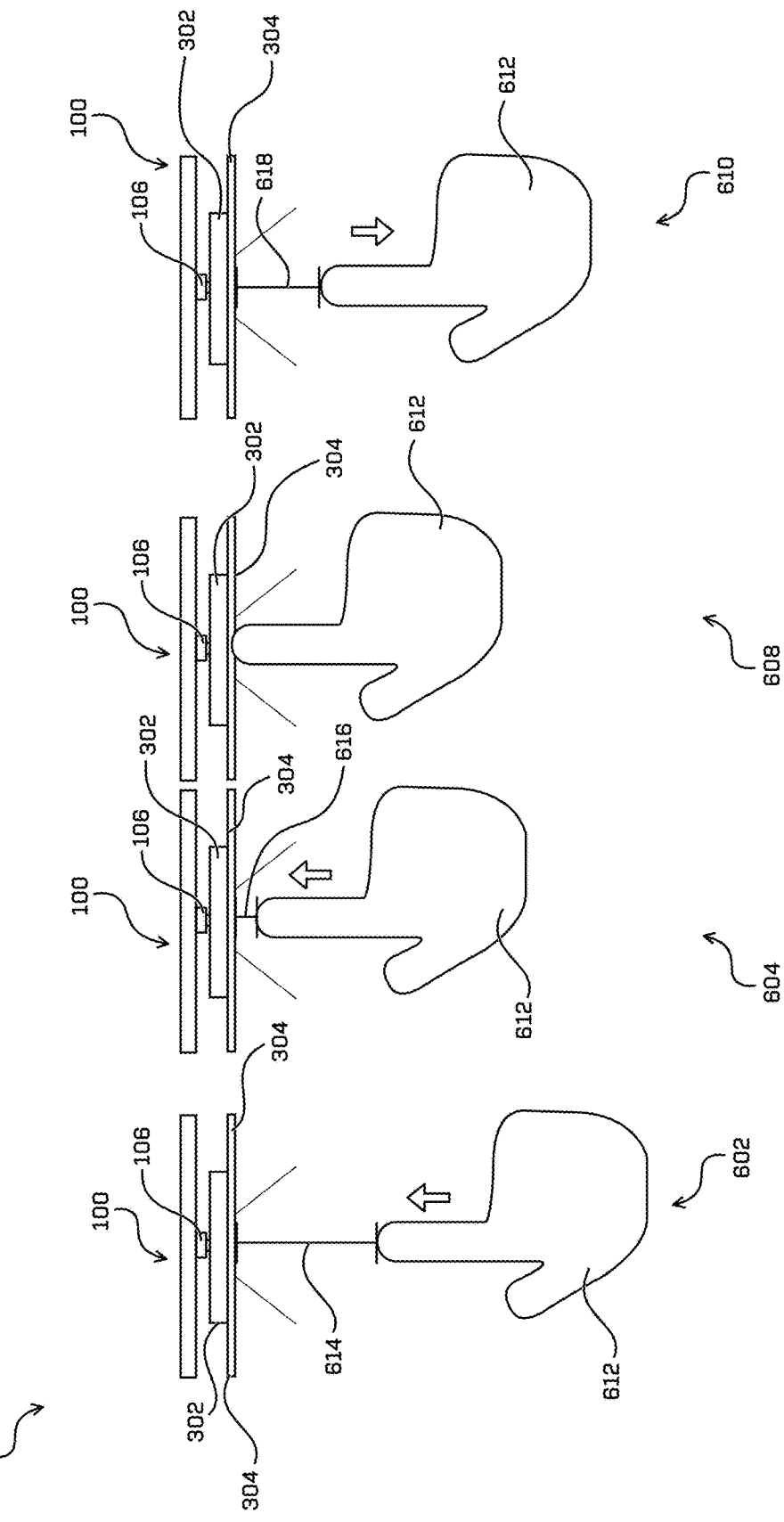
FIG. 6 is a pictorial flow diagram of an example process of actuating an example vehicle door interface system.

FIG. 6 is a pictorial flow diagram of an example process 600 for operating a door interface system 100 in accordance with examples of this disclosure. For example, some or all of the process 600 can be performed by one or more of the components in FIGS. 1-5, as described herein.

At operation 602, the door interface system 100 is configured to receive an input. In this openable configuration, the door 102 that is operatively connected to the door interface system 100 may be unlocked and ready to be opened. At operation 602, the door interface system 100 has not detected an input. As shown in operations 604 and 608 below, the door interface system 100 detects an input when an object 612, such as a human hand or finger, is moved into proximity of the exterior surface 304 of the door 102 or front surface 302 of the door interface system 100. In some examples, the object 612 may be any organic or non-organic object. In some examples, the door interface system 100 may be configured to distinguish between a human hand or finger and other objects such that it only detects a human hand or finger. At operation 602, the object 612 is a sufficient distance 614 from the door interface system 100 that it is not configured to detect an input. In some examples, an object 612 will not activate the door interface system if it is more than the threshold distance from the exterior surface 304 of the door 102 (e.g., more than 20 cm, 5 cm, or 1 cm).

At operation 604, the object 612 is moved toward the exterior surface 304 of the door 102 such that it enters the input range or activation range 616. In some examples, the activation range is between 0 cm and 20 cm. In some examples, the activation range is between 0 cm and 5 cm. In some example examples, the activation range is between 0 cm and 1 cm. At operation 604, the processor of the door interface system 100 detects a touch-on or activation event.

Operation 608 depicts a touch-on or activation event where the object 612 contacts the exterior surface 304 of the vehicle door 102. A person of ordinary skill would recognize that the proximity sensor 106 can be configured to detect an activation event when an object 612 moves into the activation range 616 (though does not physically contact) or when an object 612 contacts the exterior surface 304 of the vehicle. There may be applications of the door interface system in which contact with the exterior surface 304 of the of the door or vehicle is required for an activation event. Other applications will not require contact with the exterior surface for an activation event.

In some examples, the door interface system 100 may send a signal to the door actuator system to open the door 102 after an activation event. In some examples, the door interface system 100 signals the door 102 to open after an activation event followed by a deactivation event, as shown in operation 610. In some examples, after an activation event as shown in operations 604 and 608, the object 612 is moved away from the proximity sensor 106 until it reaches a deactivation range 618. When the proximity sensor 106 detects that the object 612 has entered the deactivation range 618, or when the proximity sensor 106 no longer detects an object 612 within the activation range 616, the door interface system registers a deactivation event. In some examples, the deactivation range 618 is any area outside of the activation range 616. In some examples, the deactivation range 618 does not abut the activation range. In some examples, the deactivation range is at least 1 cm away from the exterior surface 304 of the vehicle. In some examples, the deactivation range is at least 5 cm away from the exterior surface 304 of the vehicle. In some examples, the deactivation range is at least 20 cm away from the exterior surface 304 of the vehicle.

In some examples, the door interface system 100 sends a signal to the door actuator system to open the door 102 after the proximity sensor 106 detects an activation event 604, 608 followed by a deactivation event 610. In some examples, the deactivation event 610 must occur within a prescribed time after the activation event 604, 608. In some examples, the door interface system 100 can signal the actuator system to open the door 102 if the proximity sensor 106 detects a deactivation event 610 within about 10 seconds of an activation event 604, 608. In some examples, the door interface system 100 will signal the actuator system to open the door 102 if the proximity sensor 106 detects a deactivation event 610 within about 7 seconds of an activation event 604, 608. In some examples, the door interface system 100 will signal the actuator system to open the door 102 if the proximity sensor 106 detects a deactivation event 610 within about 2 seconds of an activation event 604, 608.

Figure 7:
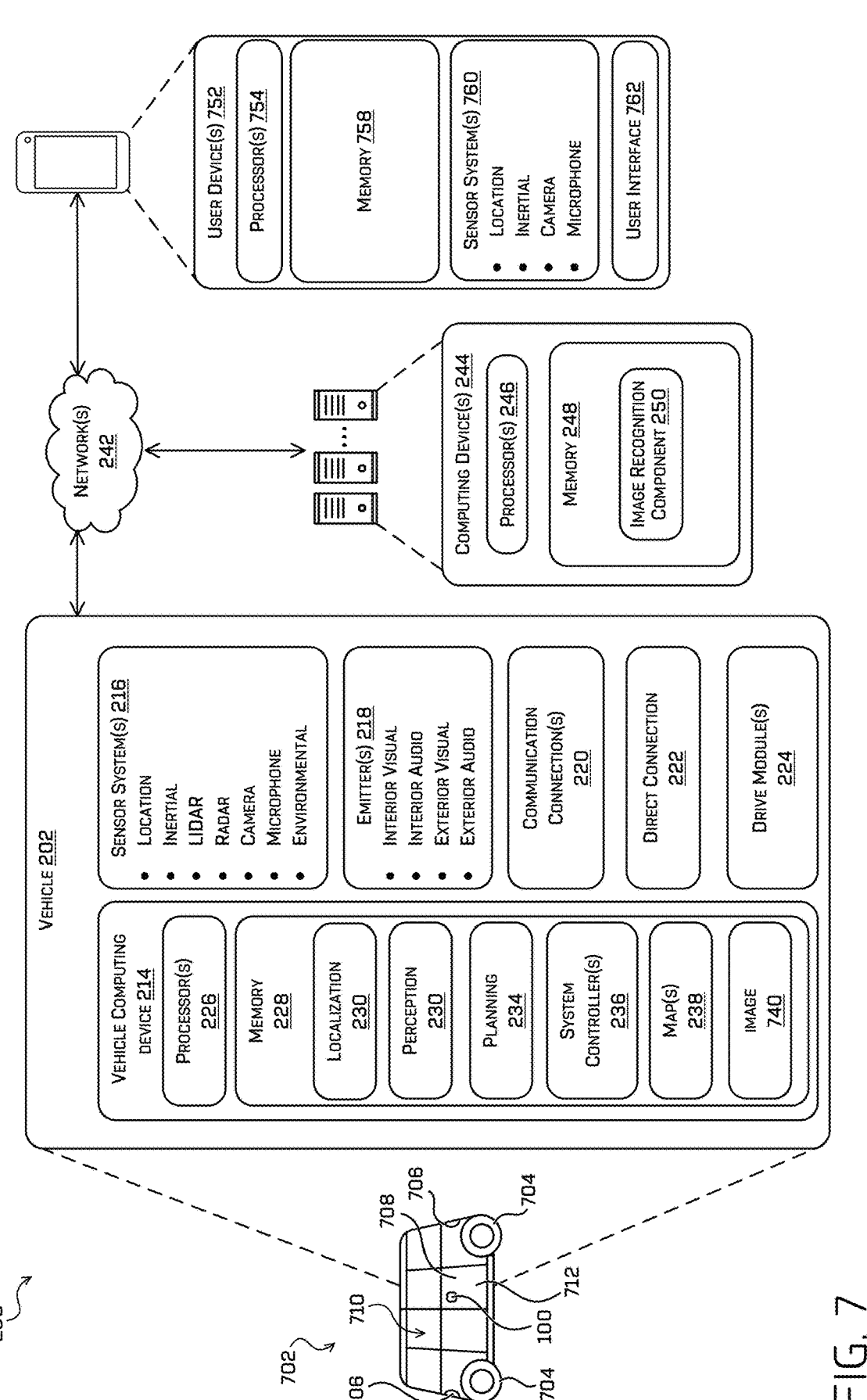
FIG. 7 depicts a block diagram of an example system for implementing the techniques described herein.

FIG. 7 depicts a block diagram of an example system 700 for implementing the systems and techniques described herein. In at least one example, the system 700 can include a vehicle 702. FIG. 7 shows an example vehicle 702 having a longitudinal axis generally aligned with the direction of travel when the vehicle is traveling straight (not turning) and a lateral axis perpendicular to the longitudinal axis. As shown the vehicle 702 includes four wheels 704 with two wheels/tires positioned at each longitudinal end 706 of the vehicle 702. The vehicle may include doors 708 positioned proximate longitudinal the center of the vehicle 702 on the lateral sides 710 of the vehicle. FIG. 7 depicts one lateral side 710 of the vehicle. In some examples, the opposing side is a mirror image of the lateral side shown in FIG. 7. In some examples, the opposing lateral side of the vehicle may not include a door or may include a door of a different size or structure. Each of the doors 708 may include one or more door panels 712, shown in more detail in FIGS. 8A and 8B below.

In addition to the door interface system described above, the vehicle 702 can include a vehicle computing device 714, one or more sensor systems 716, one or more emitters 718, one or more communication connections 720, at least one direct connection 722, and one or more drive modules 724.

The vehicle computing device 714 can include one or more processors 726 and memory 728 communicatively coupled with one or more processors 726. In the illustrated example, the vehicle 702 is an autonomous vehicle; however, the vehicle 702 could be any other type of vehicle, or any other system having an operable door 708. In the illustrated example, the memory 728 of the vehicle computing device 714 stores a localization component 730, a perception component 732, a planning component 734, one or more system controllers 736, one or more maps 738, and an image recognition component 740. Though depicted in FIG. 7 as residing in memory 728 for illustrative purposes, it is contemplated that the localization component 730, the perception component 732, the planning component 734, the one or more system controllers 736, the one or more maps 738, and the image recognition component 740 can additionally, or alternatively, be accessible to the vehicle 702 (e.g., stored on, or otherwise accessible by, memory remote from the vehicle 702).

In at least one example, the localization component 730 can include functionality to receive data from the sensor system(s) 716 to determine a position and/or orientation of the vehicle 702 (e.g., one or more of an x-, y-, z-position, roll, pitch, or yaw). For example, the localization component 730 can include and/or request/receive a map of an environment and can continuously determine a location and/or orientation of the autonomous vehicle within the map. In some instances, the localization component 730 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 730 can provide data to various components of the vehicle 702 to determine an initial position of an autonomous vehicle for generating a candidate trajectory, as discussed herein.

In some instances, the perception component 732 can include functionality to perform object detection, segmentation, and/or classification. In some examples, the perception component 732 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional and/or alternative examples, the perception component 732 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 734 can determine a path for the vehicle 702 to follow to traverse through an environment. For example, the planning component 734 can determine various routes and trajectories and various levels of detail. In at least one example, the planning component 734 can determine a location of a user based on image data of an environment received from the user using, for example, bags of binary words with image based features, artificial neural network, and the like. Further, the planning component 734 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 702 can stop to pick up a passenger. In at least one example, the planning component 734 can determine a pickup location based at least in part on determining a user identity (e.g., determined via image recognition or received as an indication from a user device, as discussed herein).

In at least one example, the vehicle computing device 714 can include one or more system controllers 736, which can be configured to control steering, propulsion, braking, safety, emitters, communication, and other systems of the vehicle 702. These system controller(s) 736 can communicate with and/or control corresponding systems of the drive module(s) 724 and/or other components of the vehicle 702.

The memory 728 can further include one or more maps 738 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 738 can include at least one map (e.g., images and/or a mesh). In some example, the vehicle 702 can be controlled based at least in part on the maps 738. That is, the maps 738 can be used in connection with the localization component 730, the perception component 732, and/or the planning component 734 to determine a location of the vehicle 702, identify objects in an environment, and/or generate routes and/or trajectories to navigate within an environment.

In some examples, the one or more maps 738 can be stored on a remote computing device(s) (such as the computing device(s) 744) accessible via network(s) 742. In some examples, multiple maps 738 can be stored based on, for example, a characteristic (e.g., type of entity, time of day, day of week, season of the year, etc.). Storing multiple maps 738 can have similar memory requirements, but increase the speed at which data in a map can be accessed.

The image recognition component 740 can include functionality to identify one or more persons, buildings, locations, and the like, in data captured by sensors on the vehicle 702 and/or in data provided to the vehicle 702. For example, the image recognition component 740 can receive image data representing a user (e.g., captured by a user device and provided to the vehicle 702) and can receive image data captured by one or more sensors of the vehicle 702 to determine that the user is represented in such image data. For example, the image recognition component 740 can use an image recognition algorithm to compare unknown image data (or image data representing an unknown user) with image data including a known representation of a user to determine if the user is represented in such image data. In some instances, the image recognition component 740 can be used to determine a location represented in image data received from a user device (e.g., to determine a location associated with a user). This functionality may be integrated with the door interface system as described below.

In some instances, aspects of some or all of the components discussed herein can include any models, algorithms, and/or machine learning algorithms. For example, in some instances, the components in the memory 728 (and the memory 748 and 758, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

In at least one example, the sensor system(s) 716 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 206 can include multiple instances of each of these or other types of sensors. For instance, the LIDAR sensors can include individual LIDAR sensors located at the corners, front, back, sides, and/or top of the vehicle 702. As another example, the camera sensors can include multiple cameras disposed at various locations about the exterior and/or interior of the vehicle 702. The sensor system(s) 716 can provide input to the vehicle computing device 714. Additionally or alternatively, the sensor system(s) 716 can send sensor data, via the one or more networks 742, to the one or more computing device(s) at a particular frequency, after a lapse of a predetermined period of time, in near real-time, etc.

The vehicle 702 can also include one or more emitters 718 for emitting light and/or sound, as described above. The emitters 718 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 718 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. In some examples, the emitters are used in operation of the door interface system as described below.

The vehicle 702 can also include one or more communication connection(s) 720 that enable communication between the vehicle 702 and one or more other local or remote computing device(s). For instance, the communication connection(s) 720 can facilitate communication with other local computing device(s) on the vehicle 702 and/or the drive module(s) 724. Also, the communication connection(s) 720 can allow the vehicle to communicate with other nearby computing device(s) (e.g., other nearby vehicles, traffic signals, etc.). The communications connection(s) 720 also enable the vehicle 702 to communicate with a remote teleoperations computing device or other remote services.

The communications connection(s) 720 can include physical and/or logical interfaces for connecting the vehicle computing device 714 to another computing device or a network, such as network(s) 742. For example, the communications connection(s) 720 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 can include one or more drive modules 724. In some examples, the vehicle 702 can have a single drive module 724. In at least one example, if the vehicle 702 has multiple drive modules 724, individual drive modules 724 can be positioned on opposite ends of the vehicle 702 (e.g., the front and the rear, etc.). In at least one example, the drive module(s) 724 can include one or more sensor systems to detect conditions of the drive module(s) 724 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 724. In some cases, the sensor system(s) on the drive module(s) 724 can overlap or supplement corresponding systems of the vehicle 702 (e.g., sensor system(s) 716).

In at least one example, the localization component 730, perception component 732, the planning component 734, and/or the image recognition component 740 can process sensor data, as described above, and can send their respective outputs, over the one or more network(s) 742, to one or more computing device(s) 744 and/or to one or more user device(s) 752 (also referred to as a user device 752). In at least one example, the localization component 730, the perception component 732, the planning component 734, and/or the image recognition component 740 can send their respective outputs to the one or more computing device(s) 744 at a particular frequency, after a lapse of a predetermined period of time, in near real-time, etc.

The vehicle 702 can send sensor data to one or more computing device(s) 744 and/or the user device(s) 752, via the network(s) 742. In some examples, the vehicle 702 can send raw sensor data to the computing device(s) 744 and/or the user device(s) 752. In other examples, the vehicle 702 can send processed sensor data and/or representations of sensor data to the computing device(s) 742 and/or the user device(s) 752. In some examples, the vehicle 702 can send sensor data to the computing device(s) 742 and/or the user device(s) 752 at a particular frequency, after a lapse of a predetermined period of time, in near real-time, etc. In some cases, the vehicle 702 can send sensor data (raw or processed) to the computing device(s) 744 and/or the user device(s) 752 as one or more log files.

The computing device(s) 744 can receive the sensor data (raw or processed) to facilitate locating vehicles and/or user, as discussed herein. For example, the computing device(s) 744 can receive image data from the user device 752 to determine a location associated with the user device 752 and/or an identity of the user associated with the user device 752. In at least one example, the computing device(s) 744 can include processor(s) 746 and memory 748 communicatively coupled with the processor(s) 746.

In at least one example, the vehicle 702 can send and/or receive data to and from the user device(s) 752, via the network(s) 742. As described above, the user device(s) 752 can be associated with a mobile device of a passenger (to be picked up) and/or of a user who hailed the vehicle 702 for another passenger. In some examples, the vehicle 702 can send raw sensor data to the user device(s) 752. In other examples, the vehicle 702 can send processed sensor data to the user device(s) 752. In at least one example, the vehicle 702 can send sensor data (e.g., raw or processed) to an intermediary device, which can send a representation of the sensor data to the user device(s) 752. In some examples, the vehicle 702 can send sensor data to the user device(s) 752 at a particular frequency, after a lapse of a predetermined period of time, in near real-time, responsive to a request from the user device 752, etc. The user device(s) 752 can receive the sensor data (raw or processed) and can output the sensor data to assist an associated user with locating the vehicle 702, or can assist an associated user with determining a user identity of a passenger to be picked up by the vehicle 702. In at least one example, the user device(s) 752 can include one or more processors 754 and memory 758 communicatively coupled with the one or more processors 754.

The user device 752 can further include one or more sensors systems 760, which can include, location sensor(s) (e.g., GPS sensor(s)), inertial (e.g., accelerometer(s), magnetometer(s), etc.), camera(s), microphone(s), and the like. The user device 752 can further include one or more user interfaces 256, which can include, but is not limited to, one or more displays (e.g., including input capabilities), gesture-based inputs, haptic feedback, etc.

The processor(s) 726 of the vehicle 702, the processor(s) 746 of the computing device(s) 744, and/or the processor(s) 754 of the user device(s) 752 can be any suitable processor capable of executing instructions to process data and perform operations as described herein. By way of example and not limitation, the processor(s) 726, 744, and 754 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 728, 748, and 758 are examples of non-transitory computer-readable media. The memory 728, 748, and 758 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 744 and/or components of the computing device(s) 744 can be associated with the vehicle 702. That is, the vehicle 702 can perform one or more of the functions associated with the computing device(s) 744, and vice versa.

Figure 8A:
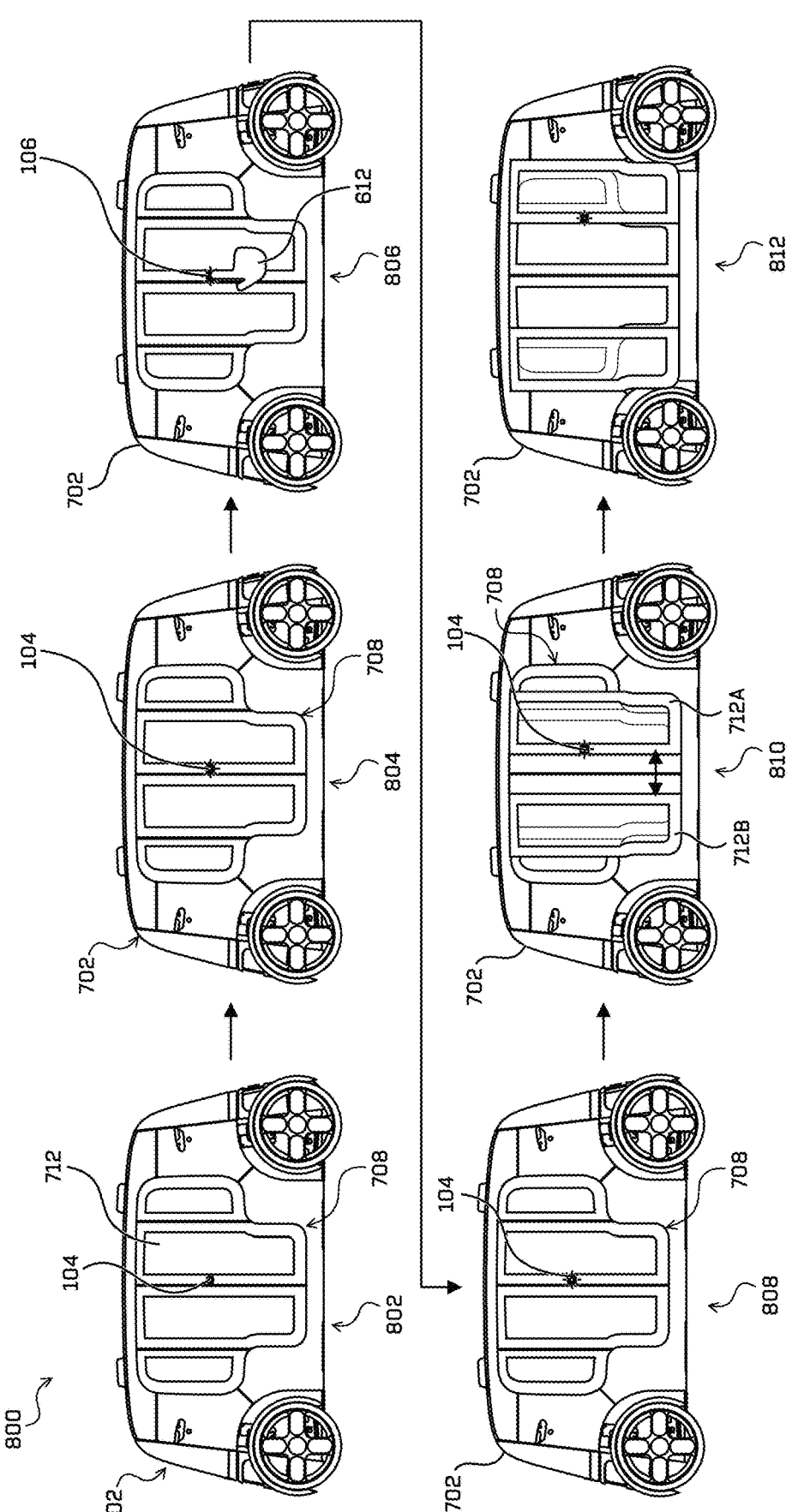
FIG. 8A is a pictorial flow diagram of an example process of opening a vehicle door using an example door interface system.

FIG. 8A is a pictorial flow diagram of an example process 800 of opening a vehicle door 708 using a door interface system 100 with a visual indicator 104. In some examples, the visual indicator 104 may indicate the status of the door 708. The door status can include locked, unlocked, open, closed, opening, closing, about to open, about to close, openable, and closeable, user authenticated, error and calling teleoperations though any other statis is contemplated. In some examples, the vehicle may have more than one door. In some circumstances, it may be safe to enter and exit one door but not another. The visual indicator can indicate whether a door is available for entering and exiting. The door 708 can have multiple statuses at the same time. The visual indicator 104 and other emitters 718 of the vehicle may change configurations to indicate the different statuses or combination of statuses of the vehicle door 708. While the examples below discuss the visual indicator 104 displaying different colors and/or patterns of light, it is understood that other types of visual indicators may be used to indicate the status of the vehicle door. Example light patterns include a rotating pattern of light or an alternating pattern of light. The alternating pattern of light can include alternating between top and bottom, left and right, or opposing corners. Example patterns can also include changing intensity, changing hue, flashing, pulsing, or any combination of the above described patterns.

At operation 802, the vehicle door 708 is closed and not openable. The vehicle door 708 may be locked. The vehicle 702 may be in motion or may have not reached its destination or not be in a position where it is safe to enter or exit the vehicle. The visual indicator 104 can indicate this status by not displaying any light and generally being dark or not visible. In some examples, the visual indicator 104 can display a solid color such as red or orange. In still other examples, the visual indicator 104 may display a symbol indicative of the locked status, such as a lock symbol, a circle with a red slash through the center, etc.

At operation 804, the vehicle door 708 is closed, unlocked, and openable. The vehicle 702 may have reached its destination or pick-up point. The visual indicator 104 displays a configuration different than the display at operation 802. The visual indicator 104 may display a solid color such as white or green light. The visual indicator 104 can also display a blinking light or pattern to draw the passenger's attention to the area surrounding the proximity sensor. In some examples, the visual indicator 104 can display a conspicuous animation (e.g., flashing on/off, pulsing intensity, and/or a moving light pattern) while the vehicle is at operation 804. Other emitters 718 may also be configured to indicate the openable status of the door contemporaneously with visual indicator 104 of the door interface system 100. For example, the exterior visual or audio emitters may be activated to indicate the openable status of the door.

At operation 806, an object 612, such as a passenger's hand or finger is moved within a threshold detection distance, such that the proximity sensor 106 of the door interface system detects an activation and deactivation event and the door interface system sends a signal to the door actuator system to open the door.

At operation 808, the door 708 is about to open. In some examples, the color and/or pattern emitted by the visual indicator 104 at operation 808 is different than that at operation 804 or 806. In some examples, the visual indicator 104 at operation 808 may blink or display a pattern at a faster rate than the visual indicator at operation 804. The visual indicator 104 at operation 808 may display a different color than at operation 804. The visual indicator 104 may change appearance to indicate to the passenger that the passenger's input into the door interface system was successful and the doors are opening eminently. Other emitters 718 may also be configured to indicate the about to open status of the door contemporaneously with visual indicator 104 of the door interface system 100. For example, the exterior visual or audio emitters may be activated to indicate the about to open status of the door.

At operation 810, the door 708 is opening. The door 708 may open by the first door panel 712A and the second door panel 712B moving in opposite directions along the longitudinal axis of the vehicle 702. In this example, the visual indicator 104 of the door interface system is positioned on one of the door panels 712. In some examples, the visual indicator 104 and other components of the door interface system may be positioned on other parts of the vehicle 702. In some examples, the color and/or pattern emitted by the visual indicator 104 at operation 810 is the same as that at operation 808. In some examples, the color and/or pattern emitted by the visual indicator 104 at operation 810 is different than that at operation 808. In some examples, the visual indicator 104 at operation 810 may display a solid color or can display a pattern that is different than the pattern displayed at operation 808. The visual indicator 104 at operation 810 may display a different color than at operation 808. The visual indicator 104 may change appearance to indicate to the passenger that the doors are now opening such that the passenger can stand clear of the moving door panels 712 and prepare to enter the vehicle. Other emitters 718 may also be configured to indicate the opening status of the door contemporaneously with visual indicator 104 of the door interface system 100. For example, the exterior visual or audio and/or the interior visual or audio emitters may be activated to indicate the opening status of the door.

At operation 812 the vehicle door 708 is fully open and the passengers may enter the vehicle. In some examples, the color and/or pattern emitted by the visual indicator 104 at operation 812 is different than that at operation 810. In some examples, the visual indicator 104 at operation 812 may be solid instead of blinking to indicate that the door 708 has stopped moving and it is now safe to enter the vehicle. The visual indicator 104 at operation 812 may display a different color than at operation 810. Other emitters 718 may also be configured to indicate the open status of the door contemporaneously with visual indicator 104 of the door interface system 100. For example, the exterior visual or audio and/or the interior visual or audio emitters may be activated to indicate that the door is open and it is safe to enter or exit the vehicle.

Figure 8B:
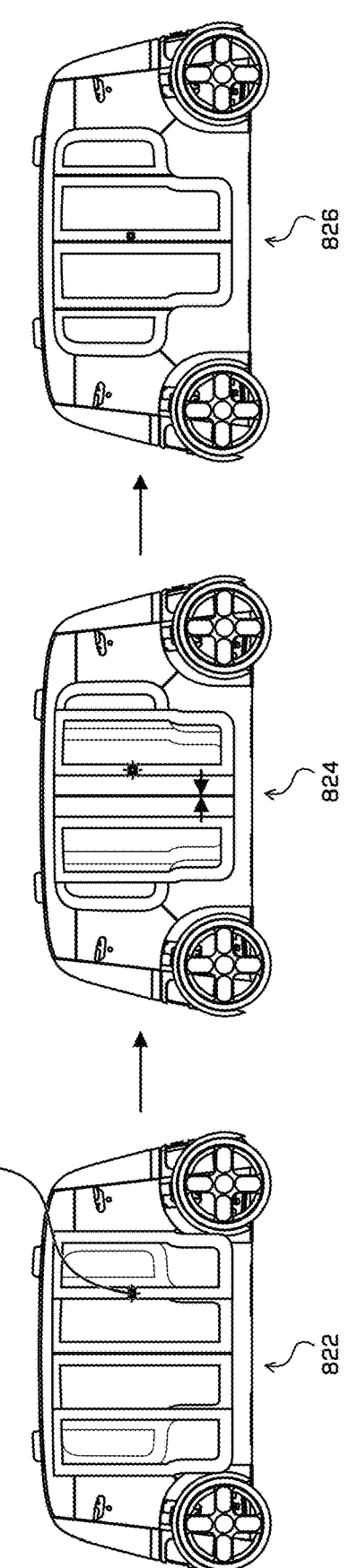
FIG. 8B is a pictorial flow diagram of an example process of closing a vehicle door using an example door interface system.

FIG. 8B is a pictorial flow diagram of an example process 820 of closing a vehicle door 708 using a door interface system 100 with a visual indicator 104. In some examples, the door interface system 100 sends a signal to the door actuator system to close the door after the door has been open for a prescribed time. In some examples, the door interface system uses sensor data from sensors on the door interface system, such as a camera 108, to determine when it is safe and appropriate to send a signal to the door actuator system to close the door. In some examples, the door interface system 100 can communicate with the sensor systems 716 of the vehicle 702 to determine when it is safe and appropriate to close the door.

At operation 822, the door interface system has sent a signal to the door actuator system to close the doors such that the doors are in the status of open and about to close. In some examples, the visual indicator 104 of the door interface system displays a color, pattern, or color and pattern combination to indicate that the door is about to close. The visual indicator 104 is configured to convey to the passenger that the doors are about to close such that the passenger can stand clear of the door. In some examples, the visual indicator 104 at operation 822 may display a similar color and/or pattern as that displayed at operation 808 described above. Other emitters 718 may also be configured to indicate the about to close status of the door contemporaneously with visual indicator 104 of the door interface system 100. For example, the exterior visual or audio and/or the interior visual or audio emitters may be activated to indicate the about to close status of the door.

At operation 824, the door is closing. In some examples, the color and/or pattern emitted by the visual indicator 104 at operation 824 is the same as that at operation 822. In some examples, the color and/or pattern emitted by the visual indicator 104 at operation 824 is different than that at operation 822. In some examples, the visual indicator 104 at operation 824 may blink faster than the visual indicator at operation 822. The visual indicator 104 at operation 824 may display a different color than at operation 822. The visual indicator 104 may change appearance to indicate to the passenger that the doors are now closing such that the passenger can stand clear of the moving door panels 712. In some examples, the visual indicator 104 at operation 824 may display a similar color and/or pattern as that displayed at operation 810 described above. Other emitters 718 may also be configured to indicate the closing status of the door contemporaneously with visual indicator 104 of the door interface system 100. For example, the exterior visual or audio and/or the interior visual or audio emitters may be activated to indicate the closing status of the door.

At operation 826, the vehicle door is fully closed. The door may have locked. The visual indicator 104 can indicate this status by not displaying any light and generally being dark or not visible. In some examples, the visual indicator 104 can display a solid color such as red.

Figure 9:
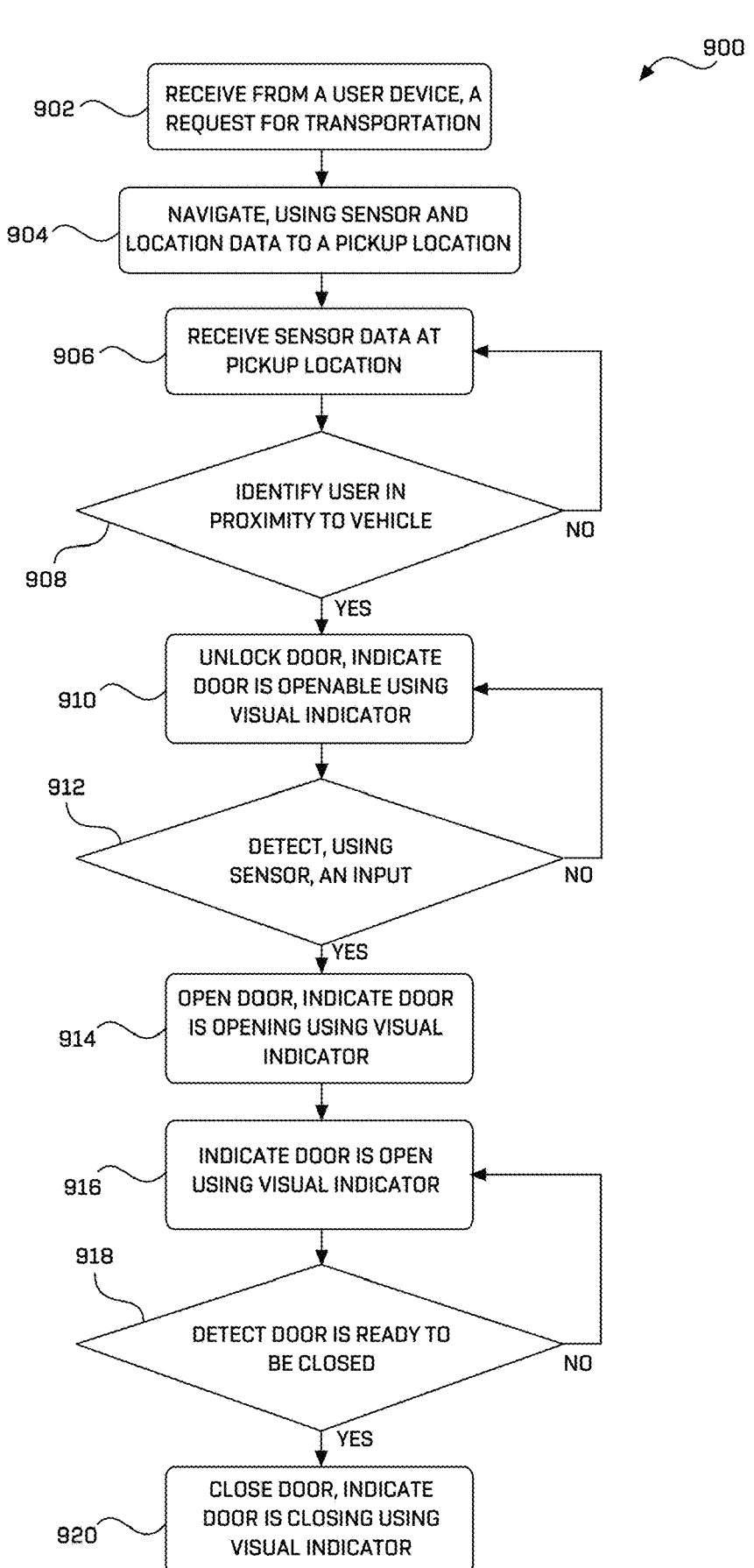
FIG. 9 depicts an example process for gaining entry to a vehicle using an example door interface system.

FIG. 9 depicts an example process 900 for gaining entry to an autonomous rideshare vehicle 702 using a door interface system 100 in accordance with the examples of the disclose. For example, some or all of the process can be formed by one or more of the components of the door interface system 100 described in FIGS. 1-5. For example, some or all of the process can be performed by one or more of the components of FIG. 7, as described herein.

At operation 902, the process can include receiving, from a user device, a request for transportation. The request can comprise a request for a ride (e.g. hailing a vehicle for transportation services).

At operation 904, the process can include commanding the vehicle to navigate towards the location. For example, the operation 904 can include dispatching a vehicle to the location and/or can include following a series of waypoints and/or routs towards the location. At operation 904, the vehicle can collect sensor data from the vehicle sensor systems to determine when the vehicle has reached the location. Operation 904 can also process the sensor data to determine if the vehicle has reached a position where it is safe to load and unload passengers. If the vehicle has not reached its destination or a safe position, the process 900 can remain in operation 904 to continue to capture sensor data in the environment. If the location and safe position is detected, the process can continue to operation 906.

At operation 906, the vehicle can collect sensor data regarding the environment surrounding the vehicle and the vehicle door. In some examples, the sensor data collected is from sensors on the door interface system, including the proximity sensor or camera sensor. In some examples, the sensor data collected includes other sensors on the vehicle including camera sensors, Bluetooth, near field sensors, or location data. In some examples, the sensor data is processed to identify the user that requested the ride. In some examples, the sensors can also detect information regarding the area surrounding the vehicle door to determine if it is safe to enter and/or exit the vehicle.

At operation 908, the process can include receiving sensor data captured in an environment proximate the location. The sensor data can include image data captured by a camera sensor of the door interface system. It can also include data captured by the sensor system of the vehicle. Operation 908 can include determining whether a representation of a user or a user device is detected in the sensor data. For example, the operation 908 can include performing segmentation and/or classification on the sensor data to determine if a user or user device is present, though any other techniques for signal identification are contemplated. In some examples, the door interface system can receive a notification from a remote computing device (e.g. teleoperations based on location services tracking a location of the user device or a user input into the user device). In some examples, the camera of the user device can detect a specific pattern displayed by the visual indicator to trigger the user device to send an authentication signal to the door interface system. In some examples, the user may be identified when the door interface system receives a signal from the user device. The user device may send a signal to the door interface system using forms of wireless communication including WiFi, Bluetooth, and Near Field Communication. In some examples, the user may communicate with a remote operator using a camera and microphone in the door interface system to identify the user in proximity to the door interface system. If no such representation or determination is made, the process can return to operation 906 to continue to capture sensor data in the environment. If a representation is detected, the process can continue to operation 910.

At operation 910, the door interface system moves the door into an openable status or configuration. In some examples, the vehicle includes a locking mechanism that is deactivated. In some examples, the door automatically opens after the user is identified. In other examples, the door interface system is configured to receive an input to open the vehicle door. The visual indicator of the door interface system displays a status indicator that the authentication process 908, 910 was successful and the door interface system is ready for user input.

At operation 912, the door interface system can detect an input using its proximity sensor. Prior to operation 910, the proximity sensor of the door interface system may be placed in an idle mode where it does not register objects entering or exiting the area proximate the proximity sensor. At operation 912, the proximity sensor of the door interface system is placed in an active mode where it does register objects entering or exiting the area proximate the proximity sensor. In some examples, the proximity sensor is detecting objects prior to operation 912. More details regarding how an input is detected are described with regards to FIG. 10 below. If no input is detected, the process can return to operation 910. If a representation is detected, the process can continue to operation 914.

At operation 914, the door interface system sends a signal to the door actuator system to open the vehicle door controlled by the door interface system based at least in part on the detection of a proximity event as described in detail herein (e.g., with respect to at least FIG. 6). The visual indicator of the door interface system can display a status indicator that the door is opening.

At operation 916, the door is open. The visual indicator of the door interface system can display a status indicator that the door is open, and it is safe to enter or exit the vehicle. As described above, other visual and audio emitters of the vehicle can also indicate the status that the doors are fully open.

At operation 918, the door interface system can detect whether the doors are ready to be closed. In some examples, the door interface system detects when the vehicle door has been open for a minimum amount of time. Once the minimum time is reached, the door interface system determines that the door is ready to be closed. In some examples, the door interface system collects sensor data regarding the area in proximity to the door. The door interface system can determine from the sensor data whether any objects obstruct the doorway to determine whether the door is ready to be closed. In some examples, the door interface system may determine the door is ready to be closed when it receives a user input. In some examples, the user input can be made using the proximity sensor of the door interface system. In some examples, the user input can be made using the user device. If no determination is made, the process can return to operation 916. If a determination is made that the door is ready to be closed, the process can continue to operation 920.

At operation 920, the door interface system sends a signal to door actuator system to close the vehicle door. The visual indicator of the door interface system can display a status indicator that the door is closing.

Figure 10:
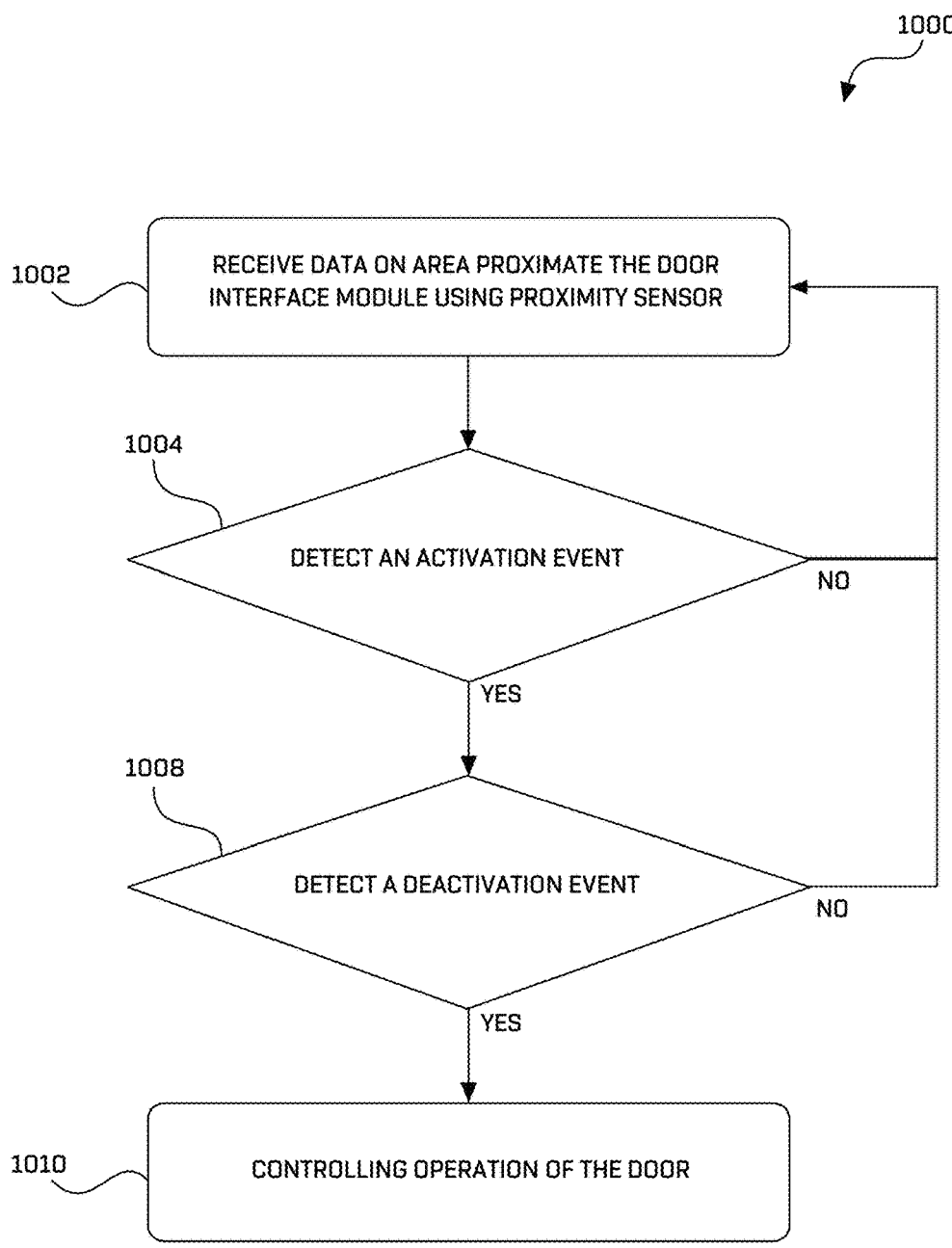
FIG. 10 depicts an example process for detecting, using a proximity sensor, an input.

FIG. 10 depicts an example process 1000 for detecting an input using the proximity sensor of a door interface system. In some examples, the door interface system can be on a vehicle including an autonomous rideshare vehicle 702 like the one shown in FIG. 7. In some examples, the door interface system can be operatively connected to any actuating door, gate, or other moving device.

At operation 1002, the process can include the proximity sensor collecting data regarding objects in the area proximate the door interface system. In some examples, the proximity sensor is always collecting data. In some examples, the proximity sensor can be configured in an idle mode where it is not collecting data or not processing data and an active mode where it is collecting data or not processing data. In such examples, the proximity sensor is in an active configuration at operation 1010.

At operation 1004, the door interface system can detect an activation event using its proximity sensor. In some examples, the door interface system will detect an activation event when an object, such as a user's hand or finger, moves into the activation range or threshold range of the proximity sensor. If no such activation event is detected, the operation returns to 1002, where the proximity sensor continues to collect data. If an activation event is detected, the process can continue to operation 1006.

At operation 1008, the door interface system can detect a deactivation event using its proximity sensor. In some examples, a deactivation event occurs when the proximity sensor detects that the object has entered the deactivation range or when the proximity sensor no longer detects an object within the activation or threshold range. If no such deactivation event occurs, the proximity sensor returns to operation 1002 and continues to capture sensor data regarding objects in the threshold range. If a deactivation event is detected, the process can continue to operation 1010. In some examples, the deactivation event must occur a minimum time after the activation event. The minimum time may be around 0.5 seconds. In other examples, the minimum time is around 0.2 seconds. In other examples, the minimum time is around 0.1 seconds. In some examples, the deactivation event must occur within a maximum time after the activation event. In such examples, if the prescribed time expires and no deactivation event is detected, the process returns to operation 1002. In some examples, the maximum time is approximately 5 seconds. In some examples, the maximum time is approximately 2 seconds. In some examples, the maximum time is approximately 1 seconds.

At operation 1010, the door interface system sends a signal to control the operation of the door. The door interface system may send a signal to open, close, lock, or unlock the door.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the claims.

EXAMPLE CLAUSES

The following paragraphs describe various examples. Any of the examples in this section may be used with any other of the examples in this section and/or any of the other examples or embodiments described herein.

A: In some examples, a vehicle may comprise: a first longitudinal end, a second longitudinal end opposite the first longitudinal end, a first lateral side, and a second lateral side opposite the first lateral side; and a door located on the first lateral side of the vehicle, the door comprising: an actuating system configured to open and close the door; an exterior surface wherein at least a portion of the exterior surface is transparent; and a door interface system configured to control the actuating system, the door interface system comprising a proximity sensor and a visual indicator; wherein the proximity sensor and the visual indicator of the door interface system are positioned behind the transparent portion of the exterior surface of the door; and wherein the proximity sensor is positioned proximate to the visual indicator to detect an object proximate to the visual indicator.

B: The vehicle of example A, wherein the door interface system outputs a signal to the actuating system to open the door based at least in part on detecting the object proximate the visual indicator.

C: The vehicle of example A or B, wherein the proximity sensor comprises an emitter configured to emit infrared light and a detector configured to detect the infrared light.

D: The vehicle of any one of examples A-D, wherein the visual indicator comprises: a light source; and a light guide disposed between the light source and an exterior surface of the door to transmit light from the light source through the exterior surface proximate the proximity sensor.

E: The vehicle of any one of examples A-E, wherein the visual indicator comprises multiple light-emitting diodes disposed around a periphery of the proximity sensor.

F: The vehicle of example E, wherein the multiple light-emitting diodes are configured to display at least two different colors and wherein the color displayed by the light-emitting diodes corresponds to a status of the door.

G: The vehicle of example F, wherein the status of the door includes at least one of authenticated, open, closed, opening, closing, ready to be opened, or ready to be closed.

H: The vehicle of any one of examples A-G, wherein the door comprises a first door panel and a second door panel, wherein the first door panel and the second door panel are moveable in opposite directions along a longitudinal axis of the vehicle to open the door, and wherein at least one of the proximity sensor or the visual indicator is positioned on the first door panel.

I: The vehicle of any one of examples A-H, wherein the door is a first door and the door interface system is a first door interface system, and the second lateral side comprises a second door comprising a second door interface system.

J: The vehicle of any one of examples A-I, further comprising at least one of a camera, LIDAR, or radar sensor configured to capture sensor data representing an environment proximate the vehicle, wherein the door is operated at least in part using the sensor data.

K: In some examples, a door interface assembly comprising: a door comprising an exterior surface, wherein at least a portion of the exterior surface is substantially transparent; a sensor positioned proximate to the exterior surface and configured to sense proximity of an object to the exterior surface; and a visual indicator configured to indicate a portion of the exterior surface proximate the sensor; wherein the sensor and visual indicator are positioned behind the transparent portion of the exterior surface of the door.

L: The door interface assembly of example K, wherein the sensor is a proximity sensor comprising an emitter configured to emit infrared light and a detector configured to detect infrared light.

M: The door interface assembly of example K or L, wherein the visual indicator comprises multiple light-emitting diodes disposed around a periphery of the proximity sensor.

N: The door interface assembly of example M, wherein the multiple light-emitting diodes are positioned in proximity to a light guide configured to transmit light produced by the multiple light-emitting diodes to a portion of the exterior surface, and wherein the light guide is shaped to at least partially surround the sensor.

O: The door interface assembly of any one of examples K-N, wherein the door interface system is configured to output a signal to an actuating system to open the door based at least in part on detecting the object proximate the sensor.

P: The door interface assembly of any one of examples K-O, further comprising a camera to capture sensor data representing an environment proximate the door, wherein the door is operated at least in part using the sensor data.

Q: In some examples, a door interface system comprising: a housing; a proximity sensor coupled to the housing and configured to sense proximity of an object; and a visual indicator coupled to the housing and configured to illuminate a region at least partially surrounding the proximity sensor.

R: The door interface system of example Q, wherein the visual indicator comprises multiple light-emitting diodes disposed around a periphery of the proximity sensor.

S: The door interface system of examples Q and R, wherein the visual indicator comprises one of a circle, oval, square, square with rounded corners.

T: The door interface system of any one of examples Q-S, wherein the proximity sensor comprises an emitter configured to emit infrared light and a detector configured to detect the infrared light.

U: In some examples, a method of operating a vehicle door, comprising: receiving, from a proximity sensor, first sensor data representing that an object is within a first threshold distance of a portion of the door indicated by a visual indicator at a first time; receiving, from the proximity sensor, second sensor data representing that the object is outside a second threshold distance of the portion of the door indicated by the visual indicator at a second time; and controlling operation of the vehicle door based at least in part on the first sensor data and the second sensor data.

V: The method of example U, further comprising controlling operation of the vehicle door when the second sensor data is received at least 0.2 seconds after the first sensor data.

W: The method of examples U and V, further comprising: receiving a signal indicating a status of the vehicle door, the status comprising one of locked, unlocked, opening, or closing; and outputting by, the visual indicator, a visual pattern indicative of the status of the vehicle door.

X: The method of example W, wherein the visual pattern comprises at least one of a color or pattern indicative of the status of the vehicle door.

Y: The method of any one of examples U-X, wherein at least one of the first threshold distance or the second threshold distance is approximately 20 cm.

Z: The method of any one of examples U-Y, further comprising: receiving a request to transport a user; and determining that the user is within a user threshold distance of the vehicle; wherein controlling operation of the door comprises opening the door based at least in part on the user being within the user threshold distance of the vehicle.

AA: The method of any one of examples U-Z, further comprising: receiving a request to transport a user; and determining that the user is more than a threshold distance from the vehicle; wherein controlling operation of the door comprises maintaining the door in a closed state based at least in part on the user being more than the threshold distance from the vehicle.

AB: The method of any one of examples U-AA, further comprising: receiving, from an image sensor, third sensor data representing an environment proximate the vehicle, determining whether the third sensor data includes data representing an authorized user; wherein controlling operations of the door is further based at least in part on whether the third sensor data includes data representing the user.

AC: In some examples, A system comprising: one or more processors; and receiving a request for entry from a user; determining that the user is within a threshold distance of the door; receiving, from a proximity sensor, first sensor data representing that an object is within a first threshold distance of a portion of a door indicated by a visual indicator at a first time; receiving, from the proximity sensor, second sensor data representing that the object is outside a second threshold distance of the portion of the door indicated by the visual indicator at a second time; and controlling operation of the door based at least in part on the user being within the threshold distance of the door, the first sensor data and the second sensor data.

AD: The system of example AC, further comprising controlling operation of the vehicle door when the second sensor data is received at least 0.2 seconds after the first sensor data.

AE: The system of examples AC or AD, further comprising: receiving a signal indicating a status of the door, the status comprising one of locked, unlocked, opening, or closing; and outputting by the visual indicator a visual pattern indicative of the status of the door.

AF: The system of example AE, wherein the visual pattern comprises at least one of a color or pattern indicative of the status of the door.

AG: The system of any one of examples AC-AF, wherein at least one of the first threshold distance or the second threshold distance is approximately 20 cm.

AH: The system of any one of examples AC-AG, further comprising: receiving, from an image sensor, third sensor data representing an environment proximate the door, wherein controlling operation of the door is further based at least in part on the third sensor data.

AI: The system of example AH, further comprising: determining whether the third sensor data includes data representing an authorized user; wherein controlling operations of the door is further based at least in part on whether the third sensor data includes data representing the authorized user.

AJ: In some examples, One or more non-transitory computer-readable medium storing processor-executable instructions that, when executed by one or more processors cause the one or more processors to perform operations comprising: receiving, from a proximity sensor, first sensor data representing that an object is within a first threshold distance of a portion of a door indicated by a visual indicator at a first time; receiving, from the proximity sensor, second sensor data representing that the object is outside a second threshold distance of the portion of the door indicated by the visual indicator at a second time; and controlling operation of the door based at least in part on the first sensor data and the second sensor data.

AK: The non-transitory computer-readable medium of example AJ, further comprising controlling operation of the vehicle door when the second sensor data is received at least 0.2 seconds after the first sensor data.

AL: The non-transitory computer-readable medium of examples AJ and AK, further comprising: receiving a signal indicating a status of the door, the status comprising one of locked, unlocked, opening, or closing; and outputting by the visual indicator a visual pattern indicative of the status of the door.

AM: The non-transitory computer-readable medium of example AL, wherein the visual pattern comprises at least one of a color or pattern indicative of the status of the door.

AN: The non-transitory computer-readable medium of any one of examples AJ-AM, wherein at least one of the first threshold distance or the second threshold distance is approximately 20 cm.

While the example clauses described above are described with respect to particular implementations, it should be understood that, in the context of this document, the content of the example clauses may also be implemented using other methods, devices, systems, and/or other implementations.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that some examples can be used and that changes or alterations, such as structural changes, can be made. Such examples, changes or alterations are not necessarily departures from the scope with respect to the intended claimed subject matter. While features, components, and operations may be presented in a certain arrangement, configuration, and/or order, the arrangement, configuration, and/or order may be rearranged, combined, or omitted without changing the function of the systems and methods described.

What is claimed is:

1. A door interface assembly comprising:
a door; and
a sensor associated with the door and a sensor associated with the door and configured to sense an object moving from within a first threshold distance from the door to outside the first threshold distance from the door; and
wherein the door interface assembly is configured to output a first signal to an actuating system to open the door based at least in part on:
receiving a second signal from the sensor indicative of the object moving from outside the first threshold distance from the door to within the first threshold distance from the door, and
receiving a third signal from the sensor indicative of the object moving within a second threshold distance from the door to outside the second threshold distance from the door, wherein the first threshold distance is greater than the second threshold distance.

2. The door interface assembly of claim 1, wherein the sensor is a proximity sensor comprising an emitter configured to emit infrared light and a detector configured to detect the infrared light.

3. The door interface assembly of claim 1, wherein the door is further associated with a visual indicator comprising multiple light-emitting diodes disposed around a periphery of the sensor.

4. The door interface assembly of claim 3, wherein the visual indicator is positioned behind a portion of an exterior surface of the door that is substantially transparent.

5. The door interface assembly of claim 3, wherein the multiple light-emitting diodes are positioned in proximity to a light guide configured to transmit light produced by the multiple light-emitting diodes to a portion of an exterior surface of the door, and wherein the light guide is shaped to at least partially surround the sensor.

6. The door interface assembly of claim 1, wherein the door interface assembly is configured to output the first signal to the actuating system to open the door based at least in part on the sensor detecting the object touching an exterior surface that is proximate the sensor and visual indicator.

7. The door interface assembly of claim 1, further comprising a camera to capture sensor data representing an environment proximate the door, wherein the door is operated at least in part using the sensor data.

8. The door interface assembly of claim 1,
wherein the actuating system further controls the door based at least in part on a user requesting transportation being within a user threshold distance of a vehicle.

9. The door interface assembly of claim 1,
wherein the actuating system further controls the door based at least in part on a wireless signal received from a user computing device.

10. The door interface assembly of claim 9, wherein the wireless signal is indicative of the user computing device capturing image data indicative of a pattern presented by a visual indicator associated with the door interface assembly.

11. A method comprising:
determining, based on data from a sensor, that an object is moving from within a first threshold distance from a door to outside the first threshold distance from the door; and
outputting a first signal to an actuating system to open the door based at least in part on:
receiving a second signal from the sensor indicative of the object moving from outside the first threshold distance from the door to within the first threshold distance from the door, and
receiving a third signal from the sensor the object moving within a second threshold distance from the door to outside the second threshold distance from the door, wherein the first threshold distance is greater than the second threshold distance.

12. The method of claim 11, further comprising outputting the first signal to the actuating system to open the door based at least in part on the sensor detecting the object touching an exterior surface that is proximate the sensor and visual indicator.

13. The method of claim 11, further comprising receiving image data from an image sensor, the image data representing an environment proximate the door, wherein the door is operated at least in part using the image data.

14. The method of claim 11, further comprising controlling the door based at least in part on a user requesting transportation being within a user threshold distance of a vehicle.

15. The method of claim 11, further comprising:

receiving a wireless signal from a user computing device; and controlling the door based at least in part on the wireless signal.

16. One or more non-transitory computer readable media storing computer executable instructions that, when executed, cause one or more processors to perform operations comprising:

determining, based on data from a sensor, that an object is moving from within a first threshold distance from a door to outside the first threshold distance from the door; and outputting a first signal to an actuating system to open the door based at least in part on:

receiving a second signal from the sensor indicative of the object moving from outside the first threshold distance from the door to within the first threshold distance from the door, and receiving a third signal from the sensor the object moving within a second threshold distance from the door to outside the second threshold distance from the door, wherein the first threshold distance is greater than the second threshold distance.

17. The one or more non-transitory computer readable media of claim 16, the operations further comprising outputting the first signal to the actuating system to open the door based at least in part on the sensor detecting the object touching an exterior surface that is proximate the sensor and visual indicator.

18. The one or more non-transitory computer readable media of claim 16, the operations further comprising receiving image data from an image sensor, the image data representing an environment proximate the door, wherein the door is operated at least in part using the image data.

19. The one or more non-transitory computer readable media of claim 16, the operations further comprising controlling the door based at least in part on a user requesting transportation being within a user threshold distance of a vehicle.

20. The one or more non-transitory computer readable media of claim 16, the operations further comprising:

receiving a wireless signal from a user computing device; and controlling the door based at least in part on the wireless signal.

* * * * *